US012132811B2

(12) United States Patent
Uchino et al.

(10) Patent No.: US 12,132,811 B2
(45) Date of Patent: Oct. 29, 2024

(54) PROTOCOL OVERHEAD REDUCTION FOR PACKET DATA CONVERGENCE PROTOCOL

(71) Applicant: QUALCOMM Incorporated, San Diego, CA (US)

(72) Inventors: Toru Uchino, Zushi (JP); Umesh Phuyal, San Diego, CA (US); Bharat Shrestha, San Diego, CA (US); Alberto Rico Alvarino, San Diego, CA (US); Xiao Feng Wang, San Diego, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/654,402

(22) Filed: Mar. 10, 2022

(65) Prior Publication Data

US 2023/0291816 A1    Sep. 14, 2023

(51) Int. Cl.
| | | |
|---|---|---|
| *H04L 69/22* | (2022.01) | |
| *H04L 65/65* | (2022.01) | |
| *H04L 69/18* | (2022.01) | |
| *H04W 36/00* | (2009.01) | |

(52) U.S. Cl.
CPC ............ *H04L 69/22* (2013.01); *H04L 65/65* (2022.05); *H04L 69/18* (2013.01); *H04W 36/0072* (2013.01)

(58) Field of Classification Search
None
See application file for complete search history.

(56) References Cited

U.S. PATENT DOCUMENTS

| | | | | |
|---|---|---|---|---|
| 2005/0037767 A1* | 2/2005 | Kim | ...................... | H04L 69/04 455/450 |
| 2005/0094670 A1* | 5/2005 | Kim | ...................... | H04W 28/06 370/477 |
| 2005/0180383 A1* | 8/2005 | Kim | ...................... | H04W 28/06 370/349 |
| 2006/0039358 A1 | 2/2006 | Kim | | |
| 2015/0264359 A1* | 9/2015 | Vanam | .................... | H04L 65/70 375/240.27 |
| 2016/0219088 A1* | 7/2016 | Ma | ........................ | H04L 65/765 |
| 2016/0241685 A1* | 8/2016 | Shah | ....................... | H04L 69/04 |
| 2017/0085615 A1 | 3/2017 | Agrawal et al. | | |
| 2017/0347290 A1 | 11/2017 | Agrawal et al. | | |

(Continued)

FOREIGN PATENT DOCUMENTS

CN    104518851 A    4/2015

OTHER PUBLICATIONS

Bormann C., et al., "Robust Header Compression (ROHC)", Internet Citation, Nov. 24, 2000, 118 Pages, XP002211014, Sections 3-6.

(Continued)

*Primary Examiner* — Kenny S Lin
(74) *Attorney, Agent, or Firm* — Procopio, Cory, Hargreaves & Savitch LLP

(57) ABSTRACT

A receiver receives a first message including a first PDCP SN. The receiver may receive a second message including a second PDCP SN. The receiver may derive a second RTP SN based on at least one of a first RTP SN of the first message, the first PDCP SN, the second PDCP SN, or an RTP SN field of a second PDCP header composing the second message.

20 Claims, 26 Drawing Sheets

(56) References Cited

U.S. PATENT DOCUMENTS

2018/0007113 A1* 1/2018 Parron ................ H04L 65/80
2019/0124572 A1* 4/2019 Park ................ H04W 72/0453

OTHER PUBLICATIONS

International Search Report and Written Opinion—PCT/US2023/011075—ISA/EPO—Jun. 27, 2023.
Partial International Search Report—PCT/US2023/011075—ISA/EPO—Apr. 25, 2023.

* cited by examiner

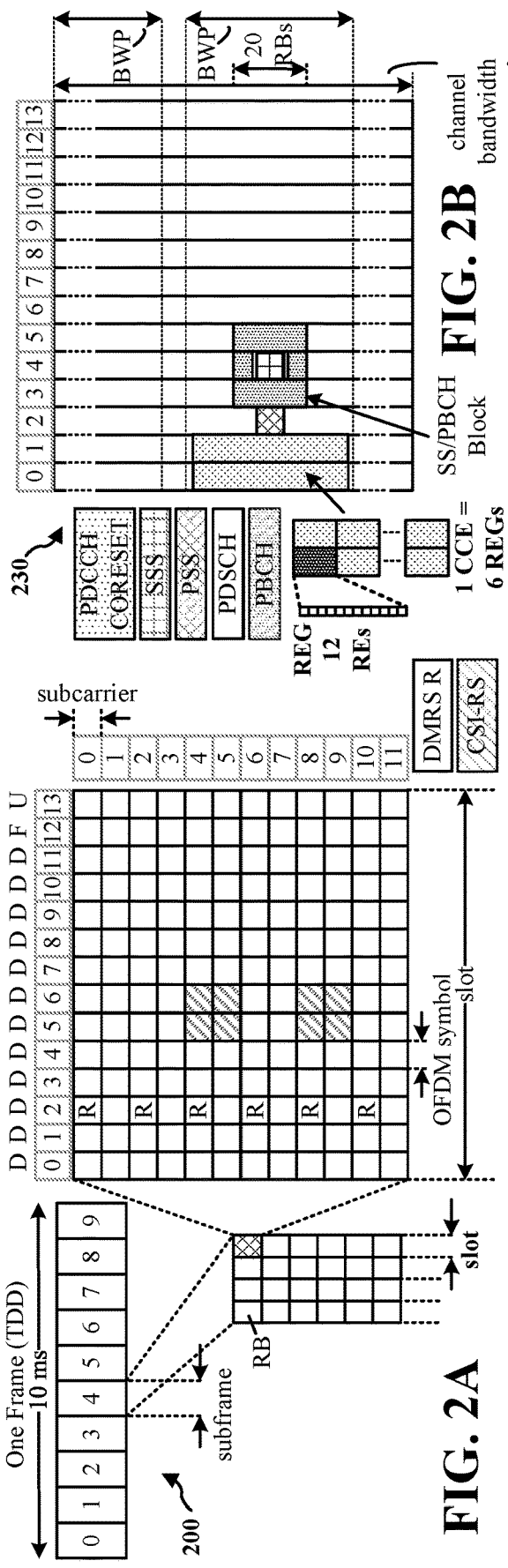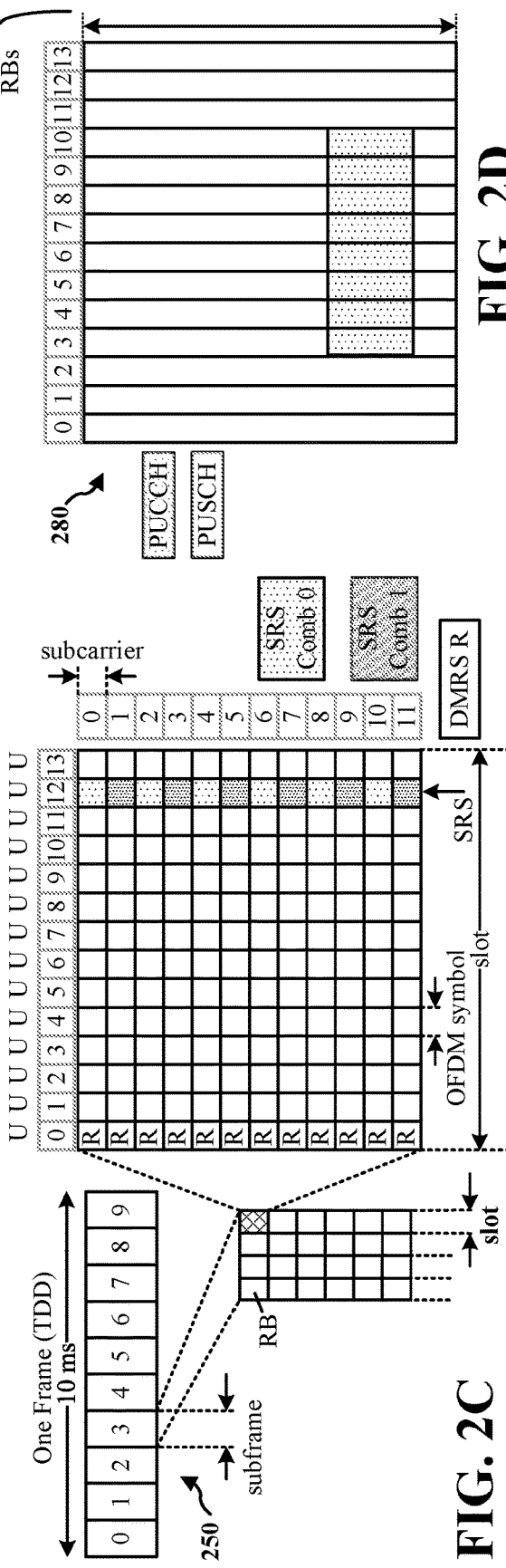
FIG. 2A  FIG. 2B  FIG. 2C  FIG. 2D

PROTOCOL OVERHEAD REDUCTION FOR PACKET DATA CONVERGENCE PROTOCOL

TECHNICAL FIELD

The present disclosure relates generally to communication systems, and more particularly, to a system for reducing protocol overhead for a wireless communication using packet data convergence protocol (PDCP).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive a first message including a first PDCP sequence number (SN). The apparatus may receive a second message including a second PDCP SN. The apparatus may derive a second real-time transport protocol (RTP) SN based on at least one of a first RTP SN of the first message, the first PDCP SN, the second PDCP SN, or an RTP SN field of a second PDCP header composing the second message.

In another aspect of the disclosure, a method, a computer-readable medium, and an apparatus are provided. The apparatus may output a first message including a first payload associated with a first RTP SN, the first RTP SN, and a first PDCP SN that is incrementally synchronized with the first RTP SN. The apparatus may obtain a confirmation that a compression context between the first RTP SN and the first PDCP SN is established at a receiver. The apparatus may output a second message including a second payload associated with a second RTP SN and including a second PDCP SN that is incrementally synchronized with the second RTP SN in response to obtaining the confirmation, where the second message does not contain a portion of the second RTP SN.

In another aspect of the disclosure, a method, a computer-readable medium, and an apparatus are provided. The apparatus may receive a message including a PDCP header and a payload. The apparatus may decompress the payload to derive a transport protocol header of the message. The apparatus may derive a user datagram protocol (UDP) checksum based on at least a portion of the derived transport protocol header in response to determining that a UDP checksum indicator of the PDCP header indicates that the message does not include the UDP checksum.

In another aspect of the disclosure, a method, a computer-readable medium, and an apparatus are provided. The apparatus may output a first message including a first payload associated with a first RTP SN, a first RTP SN including the first RTP SN, and a first PDCP header. The apparatus may also output a second message including a second payload associated with the RTP SN, and a second PDCP header, where the PDCP header includes an RTP SN field populated by at least a portion of the second RTP SN.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
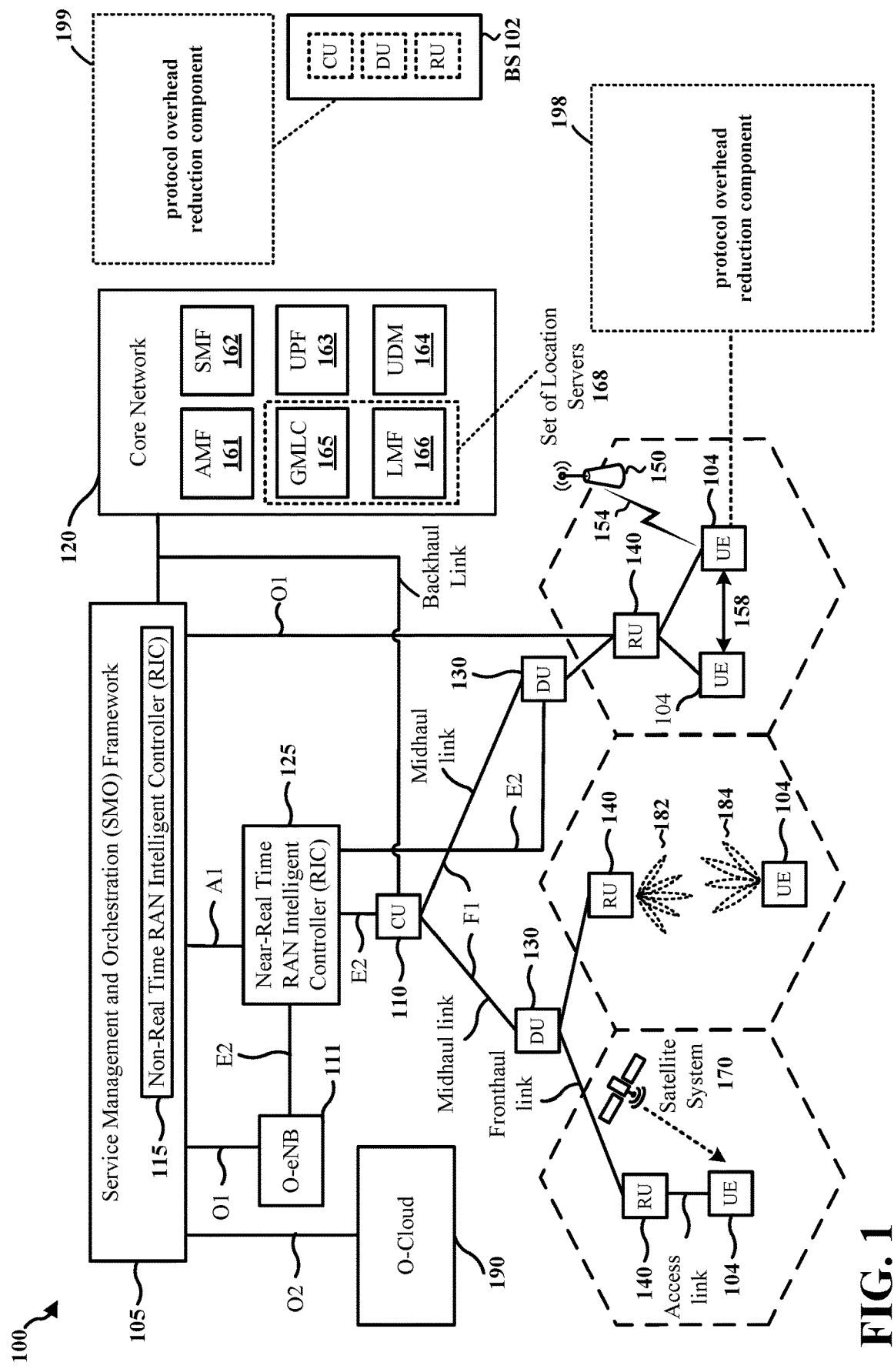
FIG. 1 is a diagram illustrating an example of a wireless communications system and an access network.

Resources may be limited when transmitting or receiving data. As an example, when transmitting or receiving data using an non-terrestrial network (NTN) or a low data rate service using a terrestrial network (TN), it may be helpful to converse wireless resources. For example, when transmitting and receiving voice data over low-data rate services using commercial smartphones, large propagation delay and satellite movement may impact data resources. Reducing overhead when transmitting or receiving data may be advantageous when extending NR coverage enhancements to NTN. For each packet generated by a codec, protocol headers may incur significant overhead. For example, a wireless device may be configured to transmit or receive protocol headers for voice bearers every 20 milliseconds (ms).

Protocol overhead may be minimized by using a robust header compression (ROHC) header to transmit service data units (SDU) in place of one or more transport protocol headers, such as an Internet protocol (IP) header, a user datagram protocol (UDP) header, and an real-time transport protocol (RTP) header. A decompressor may be configured to generate the one or more transport protocol headers by decompressing the ROHC header using a set of saved static or semi-static variables associated with the SDU. Protocol overhead may be further minimized by removing a UO-0 header from the ROHC header. A decompressor may be configured to derive the RTP SN of the removed UO-0 header from other information, such as a previously received RTP SN, a previously received PDCP SN, a PDCP SN of the PDCP SDU, or an RTP SN field of a PDCP packet data unit (PDU) of the PDCP SDU. A decompressor may be configured to derive the CRC of the removed UO-0 header from other information, such as a CRC field of a PDCP PDU of the PDCP SDU. Protocol overhead may be further minimized by removing a user datagram protocol (UDP) checksum from the ROHC header. A decompressor may be configured to regenerate the removed UDP checksum based on the generated one or more transport protocol headers.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface).

For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like.

When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite system 170 (e.g., one or more of a Global Navigation Satellite System (GNSS), satellite positioning system (SPS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to reduce protocol overhead for transmissions using a protocol overhead reduction component 198. In certain aspects, the base station 102 may be configured to reduce protocol overhead for transmissions using a protocol overhead reduction component 199. Although the following description may be focused on UL transmissions using an NTN, the concepts described herein may be applicable to other similar areas, such as terrestrial networks (TN), DL transmissions, and sidelink transmissions.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f =$ $2^{\mu} \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu*15}$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (also referred to as physical resource blocks (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of a resource block. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of resource blocks in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
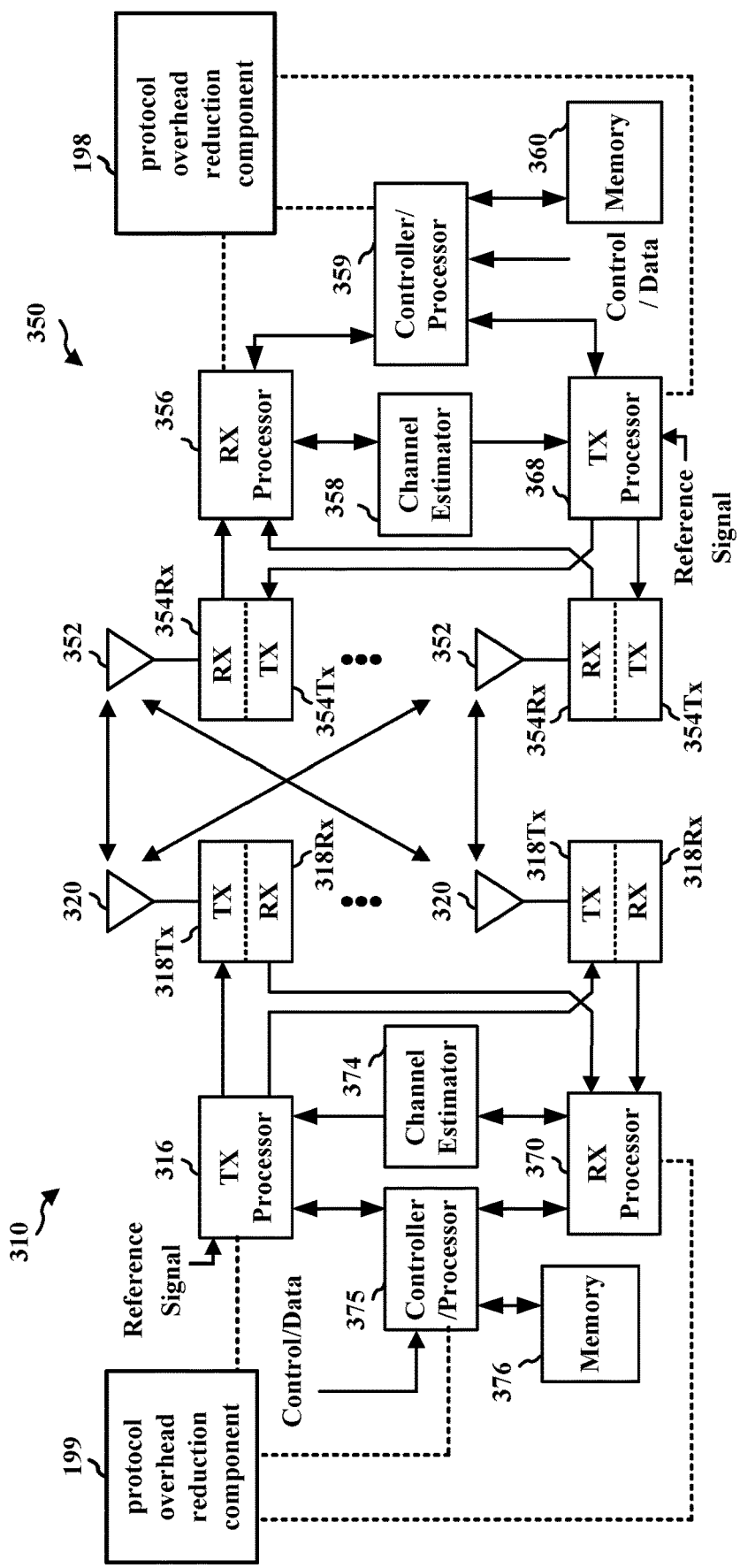
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the protocol overhead reduction component 198 of FIG. 1.

At least one of the TX processor 316, the RX processor 370, and the controller/processor 375 may be configured to perform aspects in connection with the protocol overhead reduction component 199 of FIG. 1.

Resources may be limited when transmitting or receiving data. As an example, when transmitting or receiving data using an NTN or a low data rate service using a TN, it may be helpful to converse wireless resources. For example, when transmitting and receiving voice data over low-data rate services using commercial smartphones, large propagation delay and satellite movement may impact data resources. Reducing overhead when transmitting or receiving data may be advantageous when extending NR coverage enhancements to NTN. For each packet generated by a codec, protocol headers may incur significant overhead. For example, a wireless device may be configured to transmit or receive protocol headers for voice bearers every 20 milliseconds (ms).

Figure 4:
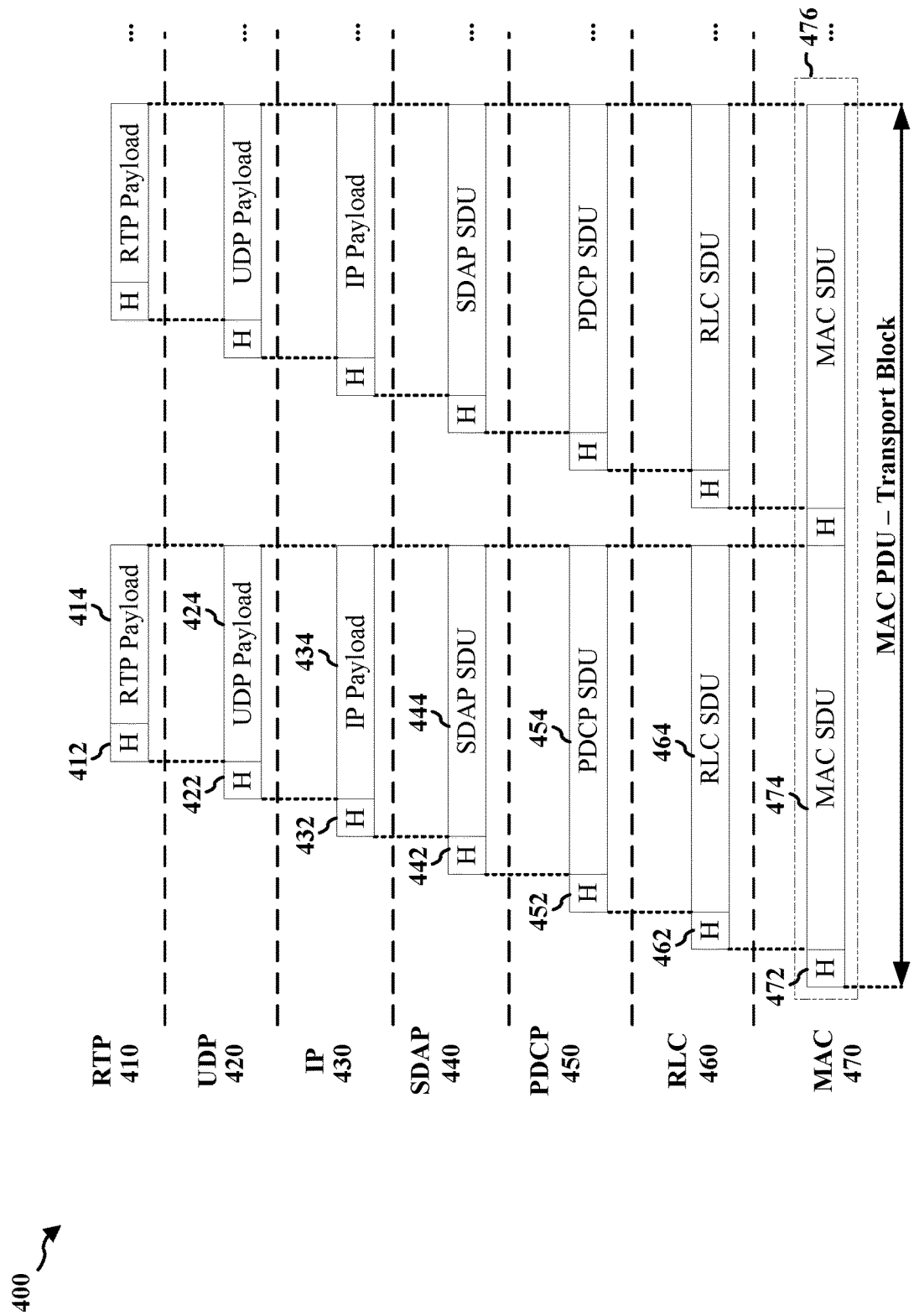
FIG. 4 is a diagram illustrating a series of example protocol headers that may be used to transport a payload.

FIG. 4 shows a diagram 400 illustrating a series of example protocol headers that may be used to transport a payload. A MAC PDU transport block 476 may have a series of payloads with headers that span a real-time transport protocol (RTP) layer 410, a user datagram protocol (UDP) layer 420, an IP layer 430, an SDAP layer 440, a PDCP layer 450, an RLC layer 460, and/or a MAC layer 470. An RTP layer 410 of a data packet may include an RTP header 412 of 12 bytes and an RTP payload 414. A UDP PDU may include a UDP header 422 of 8 bytes and a UDP payload 424. An IP PDU may include an IP header 432 of at least 20 bytes and an IP payload 434. An SDAP PDU may include an SDAP header 442 of 1 byte and an SDAP SDU 444. A PDCP PDU may include a PDCP header 452 of 2 bytes and a PDCP SDU 454. The PDCP header 452 may include a 12-bit sequence number (SN). An RLC PDU may include an RLC header 462 of 3 bytes and an RLC SDU 464. The RLC header 462 may include a 6-bit SN and a segmented SDU. A MAC PDU may include a MAC header 472 of at least 2 bytes and a MAC SDU 474. The MAC header 472 may include an 8-bit length (L) field. In total, a MAC PDU transport block may include at least 47 bytes of overhead for each MAC SDU.

Figure 5:
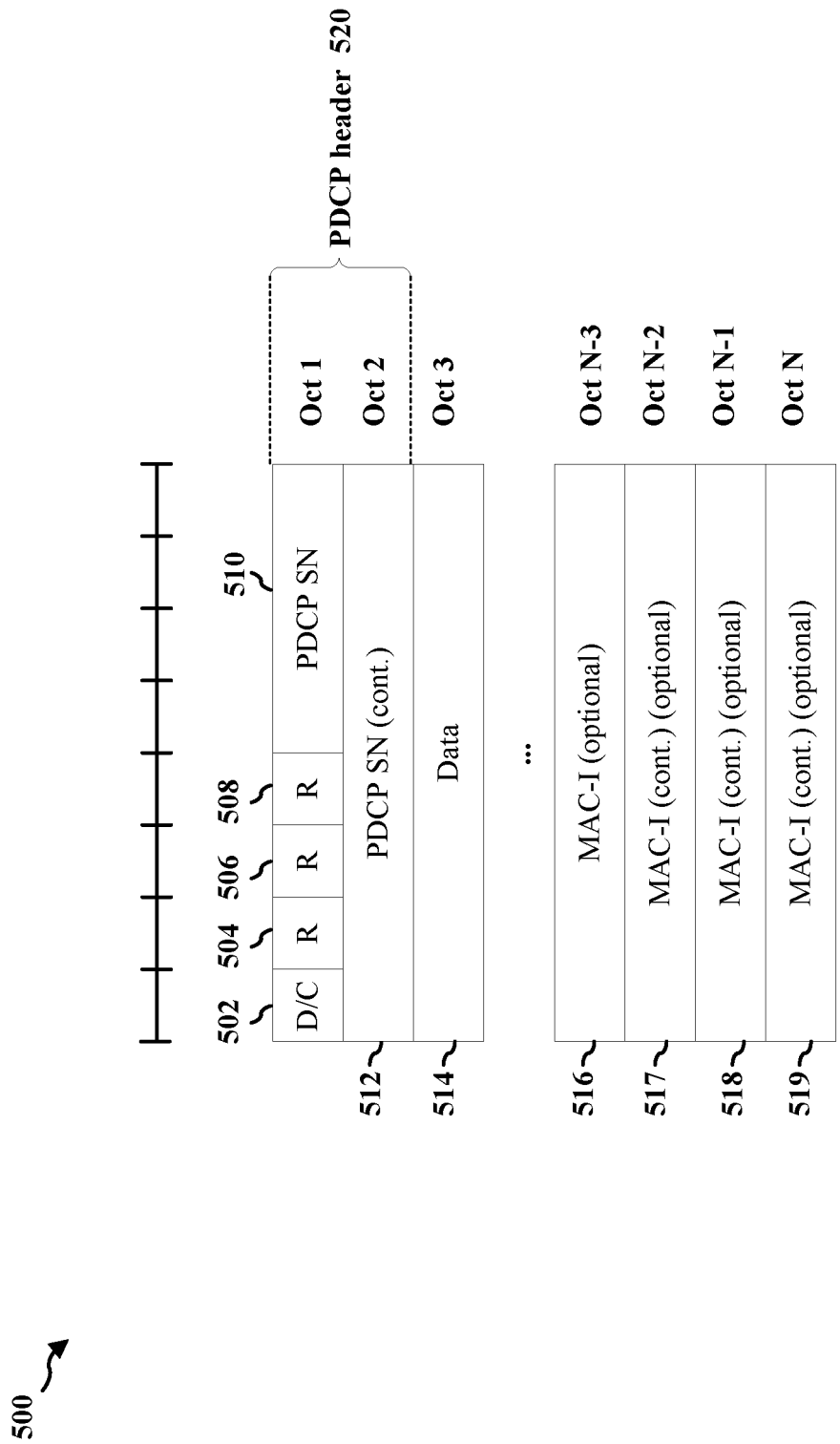
FIG. 5 is a diagram of an example PDCP PDU.

FIG. 5 shows a diagram 500 of an example PDCP PDU having octets 1 to N. The PDCP header 520 of the PDCP PDU may have octet 1 and octet 2, where a 12-bit SN spans the last 4 bits of octet 1 (a first PDCP SN field) and the 8 bits of octet 2 (a second PDCP SN field). The D/C bit field 502 of Octet 1 may include a D/C field used to indicate whether the corresponding PDCP PDU is a PDCP Data PDU or a PDCP Control PDU. The reserved bit field 504, reserved bit field 506, and reserved bit field 508 may be reserved bit fields that may be repurposed in a different specification. The 4-bit PDCP SN field 510, and 8-bit PDCP SN field 512 may be used to store a 12-bit PDCP SN. The payload data may be stored in data fields, such as data field 514 from octet 3 to octet N-4. Octets N to N-3 may include the payload for the PDCP PDU, which may include any number of bytes suitable for a payload, such as a 100 byte voice data payload or a 20 byte silence insertion descriptor (SID) data payload.

The PDCP PDU may also have a series of optional message authentication code for integrity (MAC-I) fields 516, 517, 518, and 519 that may be used to verify an integrity of a PDCP Data PDU. The diagram 500 is used to illustrate an example MAC PDU having a minimal 2-byte PDU header size. Aspects may use other MAC PDUs having larger or smaller PDU header sizes, or other fields of different sizes than shown in diagram 500.

Figure 6:
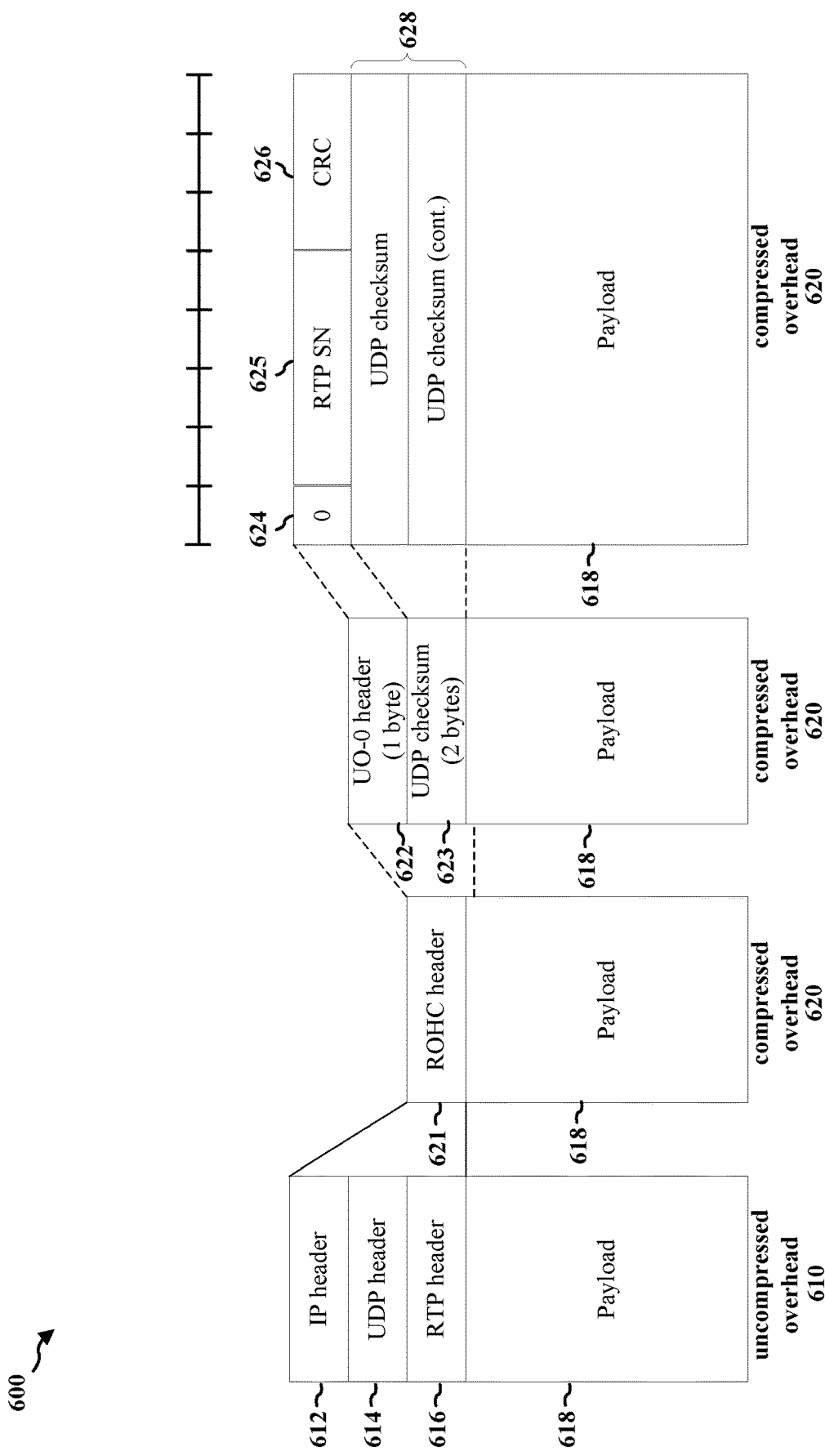
FIG. 6 is a diagram of an example uncompressed overhead and an example compressed overhead.

FIG. 6 shows a diagram 600 of uncompressed overhead 610 (e.g., an uncompressed header) and a compressed overhead 620 (e.g., a compressed header). The compressed overhead 620 is shown in various different ways to illustrate how a robust header compression (ROHC) header 621 may be configured. In the uncompressed overhead 610 example, a payload 618 may be transmitted with IP header 612, a UDP header 614, and an RTP header 616, similar to the IP header 432, UDP header 422, and RTP header 412 of SDAP SDU 444 in FIG. 4. The RTP header 616 may include one or more RTP SN fields that may be used to derive a full 16-bit or 32-bit RTP SN. Many of the fields of the IP header 612, UDP header 614, and RTP header 616 may be static between payloads (e.g., IP address, UDP port), or may be semi-static between payloads (i.e., change using a predictable pattern) (e.g., RTP SN, RTP timestamp). An RTP timestamp may be configured to change by increments of 160, as an 8 KHZ clock with a 20 ms audio sample may have a (8000 Hz)/(50 samples per second)=160 timestamp increment. Where fields of the IP header 612, UDP header 614, and RTP header 616 are static or semi-static, a receiving device (i.e., a receiver), may receive less than the full IP header 612, UDP header 614, and RTP header 616 with payload 618. Instead, a receiving device may be configured to use a shortened ROHC header 621 including 3 bytes of data for the payload 618. Since the IP header 612 may be more than 20 bytes long, the UDP header 614 may be 8 bytes long, and the RTP header 616 may be 12 bytes long, compressing all three to 3 bytes of data may provide significant overhead savings. Such shortened headers may be particularly useful for short packets, such as voice packets (e.g., 100 bytes long) or SID packets (e.g., 20 bytes long). The payload 618 of the compressed overhead 620 may be a compressed form of the payload 618 of the uncompressed overhead 610, or may be the same payload where a compressor is configured to compress the IP header 612, UDP header 614, and the RTP header 616, but not the payload 618.

In some aspects, a transmitting device or a receiving device may be configured to use an ROHC header, such as the ROHC header 621, for voice over LTE (VOLTE) or voice over NR (VoNR) transmissions. A transmitting device may have a compressor that compresses the full IP header 612, UDP header 614, and RTP header 616 into a compressed 3-byte ROHC header 621, and a receiving device may have a decompressor that decompresses the compressed 3-byte ROHC header 621 into the full IP header 612, UDP header 614, and RTP header 616. Once the compressor and decompressor have established the ROHC context, the transmitting device may only transmit a small ROHC header 621 under the assumption that the untransmitted parts of the IP header 612, UDP header 614, and RTP header 616 may be derived by the decompressor based on memorized ROHC contexts. An ROHC context may include header information, such as a static portion (e.g., IP addresses, UDP ports), and information that may be used to derive an original value of a dynamic portion (e.g., offsets or deltas). A decompressor may be configured to create and maintain ROHC context per the combination of static parts (e.g., IP address, UDP port number, synchronization source (SSRC)). A PDCP entity may be configured to maintain multiple ROHC contexts, where each ROHC context may be identified by a context ID (CID).

The ROHC header 621 may have a 1-byte UO-0 header 622, and a 2-byte UDP checksum 623. The UO-0 header 622 may include a 1-bit type field 624 indicating a type 0 packet, a 4-bit RTP SN field 625 for storing a compressed RTP SN (e.g. the 4 LSB of the RTP SN), and a 3-bit cyclic redundancy check (CRC) field 626 for storing a CRC for an initialization and refresh (IR) packet. The value in the CRC field may be used to decompress the ROHC header 621 back to the IP header 612, UDP header 614, and the RTP header 616 using the CRC value to validate the decompression. A decompressed transport header (e.g., the IP header 612, UDP header 614, and/or the RTP header 616) that fails the CRC check may be determined to be an invalid transport header. A device generating the UO-0 header 622 may populate the RTP SN field using a full 16-bit or 32-bit RTP SN. The UO-0 header may be used in a unidirectional mode (U-mode) or an optimistic mode (O-mode). For example, a bidirectional O-mode may be used in VOLTE or VoNR, and a U-mode may be used when a radio bearer (RB) is established or reestablished. The UDP checksum 623 may include a two-byte UDP fields 628 for storing a UDP checksum value. When a device is configured to use a ROHC header, such as the ROHC header 621, the ROHC header 621 may be used to replace the IP header 612, UDP header 614, and the RTP header 616 for a period of time.

Figure 7:
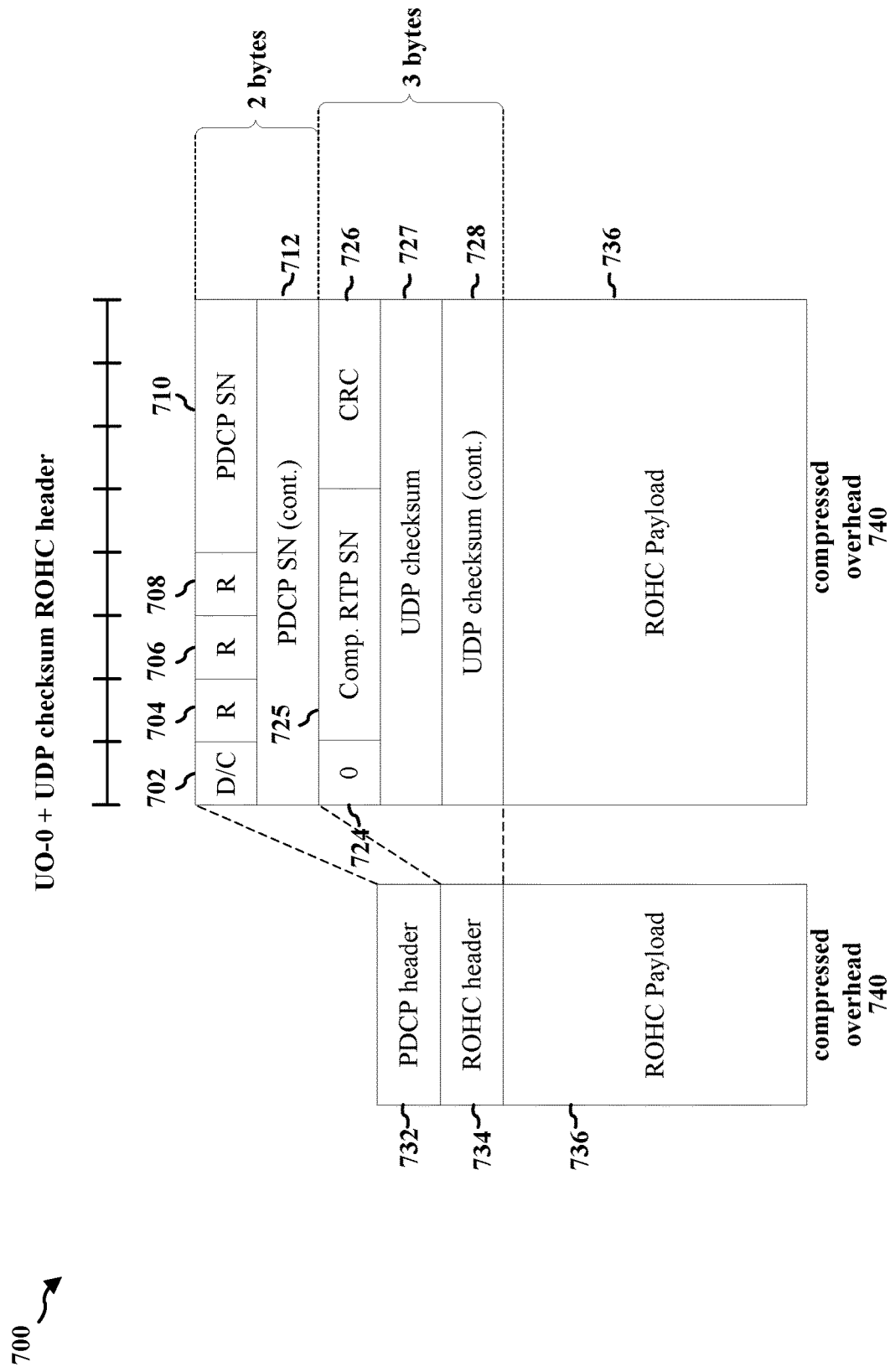
FIG. 7 shows a diagram of an example compressed overhead having a PDCP header, a ROHC header, and a ROHC payload.

FIG. 7 shows a diagram 700 of a compressed overhead 740 having a PDCP header 732, a ROHC header 734, and a ROHC payload 736. The PDCP header 732 may be configured to store 2 bytes of data and the ROHC header 734 may be configured to store 3 bytes of data. The PDCP header 732 may have a D/C field 702, a reserved field 704, a reserved field 706, a reserved field 708, a PDCP SN field 710, and a PDCP SN field 712 similar to the D/C bit field 502, reserved bit field 504, reserved bit field 506, reserved bit field 508, PDCP SN field 510, and PDCP SN field 512 in FIG. 5. The ROHC header 734 may have a type field 724, an RTP SN field 725, a CRC field 726, a UDP field 727, and a UDP field 728 similar to the type field 624, RTP SN field 625, CRC field 626, and UDP field 628 in FIG. 6.

Figure 8:
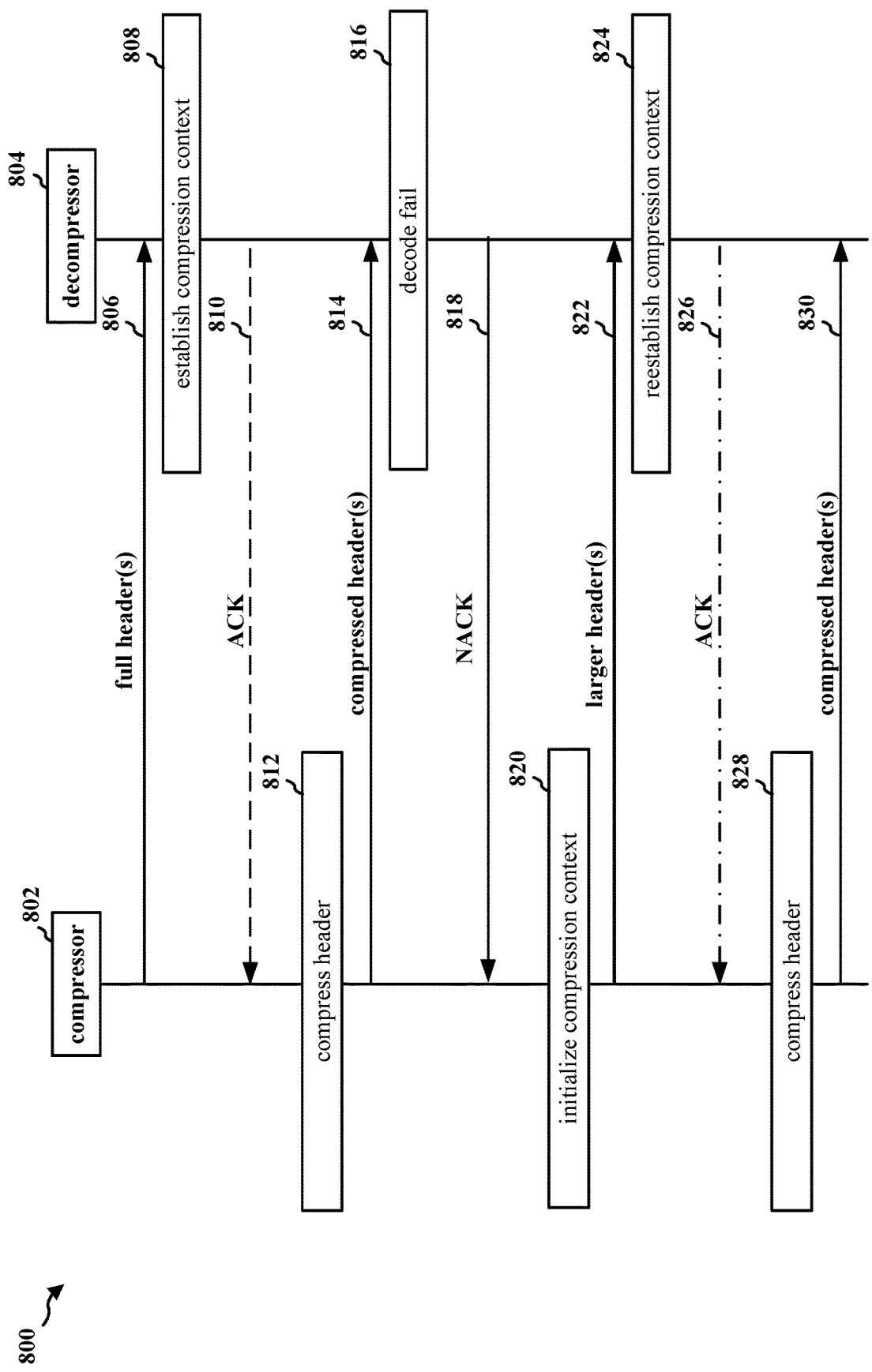
FIG. 8 shows a network connection flow diagram of a compressor and a decompressor configured to transmit and receive, respectively, ROHC headers for a payload.

In FIG. 8, a network connection flow diagram 800 having a compressor 802 and a decompressor 804 configured to transmit and receive, respectively, ROHC headers for a payload, such as the ROHC header 734 for ROHC payload 736 in FIG. 7. The compressor 802 may be controlled by, for example the protocol overhead reduction component 199 of BS 102 in FIG. 1, and the decompressor 804 may be controlled by, for example, the protocol overhead reduction component 198 of UE 104 in FIG. 1. The compressor 802 may be configured to output a full header 806 to the decompressor 804. As the compressor 802 may be a part of a BS, CU, DU, RU, or a combination thereof, the compressor 802 may be configured to transmit/receive messages with a receiving device, such as a UE, or may be configured to output/obtain a message to a device having a transceiver that transmits/receives messages with a receiving device. Similarly, as the decompressor 804 may be a part of a UE, the decompressor 804 may be configured to transmit/receive messages with a transmitting device, such as a network entity, or may be configured to output/obtain a message to a device having a transceiver that transmits/receives messages with a transmitting device.

The compressor 802 may be configured to output one or more full headers 806 to the decompressor 804, such as the IP header 612, UDP header 614, and RTP header 616 in FIG.

6. The RTP header 616 may include an RTP SN, which may be used by the decompressor 804 to determine an order of the incoming payloads and may also be used to determine if any packets are lost at an RTP level. In other words, the decompressor 804 may process the incoming payloads using the RTP SN. A threshold number of full headers 806 may be output to the decompressor 804 to ensure that data loss does not corrupt the decompressor 804's understanding of the full headers 806. The decompressor 804 may obtain the full headers 806, and use the full headers 806 to establish a ROHC context in the decompressor side. At 808, the decompressor 804 may establish a compression context, for example by saving static header data and/or information that may be used to derive a value of dynamic header data. The decompressor 804 may be configured to output an ACK 810 to the compressor 802 to confirm establishment of the compression context. The ACK 810 may be considered a confirmation or a context indicator that a compression context has been established, such as a context between an RTP SN and a PDCP SN, a context between a set of LSBs of the PDCP SN and the RTP SN, or a context between an RTP SN and any suitable reference value. The compressor 802 may be configured to confirm that a compression context is established in a plurality of ways. In one aspect, the compressor 802 may be configured to confirm establishment of a compression context in the decompressor 804 when a threshold number of full headers 806 have been output to the decompressor 804 (e.g. after two or more full headers have been transmitted).

While the decompressor 804 may be configured to determine a relationship between a reference value and the RTP SN by analyzing full headers received from the compressor 802, such as the full headers 806, the decompressor 804 may be configured to determine a relationship between the RTP SN and a reference value using any suitable means. For example, the compressor 802 may be configured to output an RRC message, an SDAP PDU, a PDCP control PDU, an RLC control PDU, a MAC-CE, a DCI, or a UCI to the decompressor 804 having contextual information, such as a series of RTP SN and a series of reference values that indicate how the RTP SN increments and the reference value increments. Contextual information may include any information that the decompressor 804 uses to determine a compression context between an RTP SN and a reference value, such as a series of incremented RTP SNs and a series of incremented reference values, or a formula/algorithm that defines a contextual relationship between an RTP SN and a reference value. Such a message may be referred to as a compression context message. In one aspect, the compressor 802 may be configured to output an RRC message having a first RTP SN, a first reference value (e.g., a count value or a PDCP SN), a second RTP SN, and a second reference value. The decompressor 804 may use the first RTP SN, first reference value, second RTP SN, and the second reference value to learn that the first RTP SN increments to the second RTP SN in incremental synchronization with the first reference value that increments to the second reference value. In another aspect, the compressor 802 may be configured to output a first RRC message having a first RTP SN and a first reference value and may be configured to output a second RRC message having a second RTP SN and a second reference value to the decompressor 804. In another aspect, the compressor 802 may be configured to output a first RRC message having a first RTP SN, a second RRC message having a first reference value, a third RRC message having a second RTP SN, and a fourth RRC message having a second reference value to the decompressor 804. In other words, the compressor 802 may be configured to output a message having any number of the RTP SN and reference values to the decompressor 804 until the decompressor 804 has a minimum of four values (two for the RTP SN and two for the reference value) that may be used to determine an incremental synchronization context between the RTP SN and the reference value.

In another aspect, the compressor 802 may be configured to output a first RRC message having a first RTP SN and a second RRC message having a second RTP SN, and the decompressor may be configured to generate a first default count value (e.g., 0) for the first RTP SN and a second default count value (e.g., 1) for the second RTP SN. The RRC message may include one or more fields (e.g. compression context field), designed to store such values, or may use an existing message type (e.g. an RRC reconfiguration complete message, UE assistant message, RRC connection request, RRC resume request, UE capability information) to provide such values. Utilizing a separate message instead of a full header may allow the compressor 802 to output one or more context messages to the decompressor 804 to establish a context in lieu of the full headers 806.

In response to determining that the decompressor 804 has established a ROHC context, the compressor 802 may be configured to compress one or more headers at 812 (e.g., IP/UDP/RTP headers) and output the compressed headers 814 to the decompressor 804. In this manner, the compressor 802 may reduce overhead by using a compressed header, such as the 3-byte ROHC header 734 in FIG. 7. In some aspects, the compressor 802 may compress a full header of over 80 bytes to a header of 3 bytes using a ROHC header. The decompressed header may include an RTP SN, which may be used by the decompressor 804 to determine an order of the incoming payloads and may also be used to determine if any packets are lost at an RTP level. In other words, the decompressor 804 may process the incoming payloads using the RTP SN from the decompressed header.

The compressor 802 may be configured to use a larger header size to update or re-synch the ROHC context of the decompressor 804. Such a larger header size may be appropriate when context mismatch is detected in the decompressor 804. For example, at 816 the decompressor 804 may fail to decode a message obtained from the compressor 802. (e.g., the decompressor 804 may detect a CRC failure). In response to detecting a bulk packet loss, the decompressor 804 may be configured to feedback a NACK 818 to the compressor 802. In response, the compressor 802 may initialize the compression context at 820, for example by initializing the ROHC context. The compressor 802 may be configured to output one or more larger headers 822 to the decompressor 804 to help the decompressor 804 reestablish the compression context at 824. The larger headers 822 may be the full header, or may be a subset of the full header that the decompressor 804 may use to reestablish the compression context at 824. In some aspects, the NACK 818 may indicate the type of data that is needed by the decompressor 804 to reestablish the compression context at 824, and the compressor 802 may be configured to select the subset of the full headers to output to the decompressor 804 as the one or more larger headers 822 in response to the indication.

Again, the decompressor 804 may be configured to output an ACK 826 to the compressor 802 to indicate that the compression context has been reestablished, and, in response, the compressor 802 may be configured to compress the header information at 828. In another aspect, the compressor 802 may be configured to compress the header information at 828 in response to outputting a threshold number of larger headers 822 to the decompressor 804. The compressor 802 may then output one or more compressed headers 830 to the decompressor 804 as before.

In some aspects, a network entity including the decompressor 804 may be configured to monitor traffic activity in an UL for a specific bearer or logical channel to initialize the layer 2 state in response to detecting an environmental trigger. For example, in response to detecting that no valid packet was received or delivered with the compressor 802 for a predefined time period since the last valid packet, the network entity may output an RRC connection release, intra-cell handover (HO), an RB removal or an RB addition. Such a trigger may be performed by any logical node of a BS, such as the CU 110, DU 130, or RU 140 of BS 102 in FIG. 1.

Figure 9:
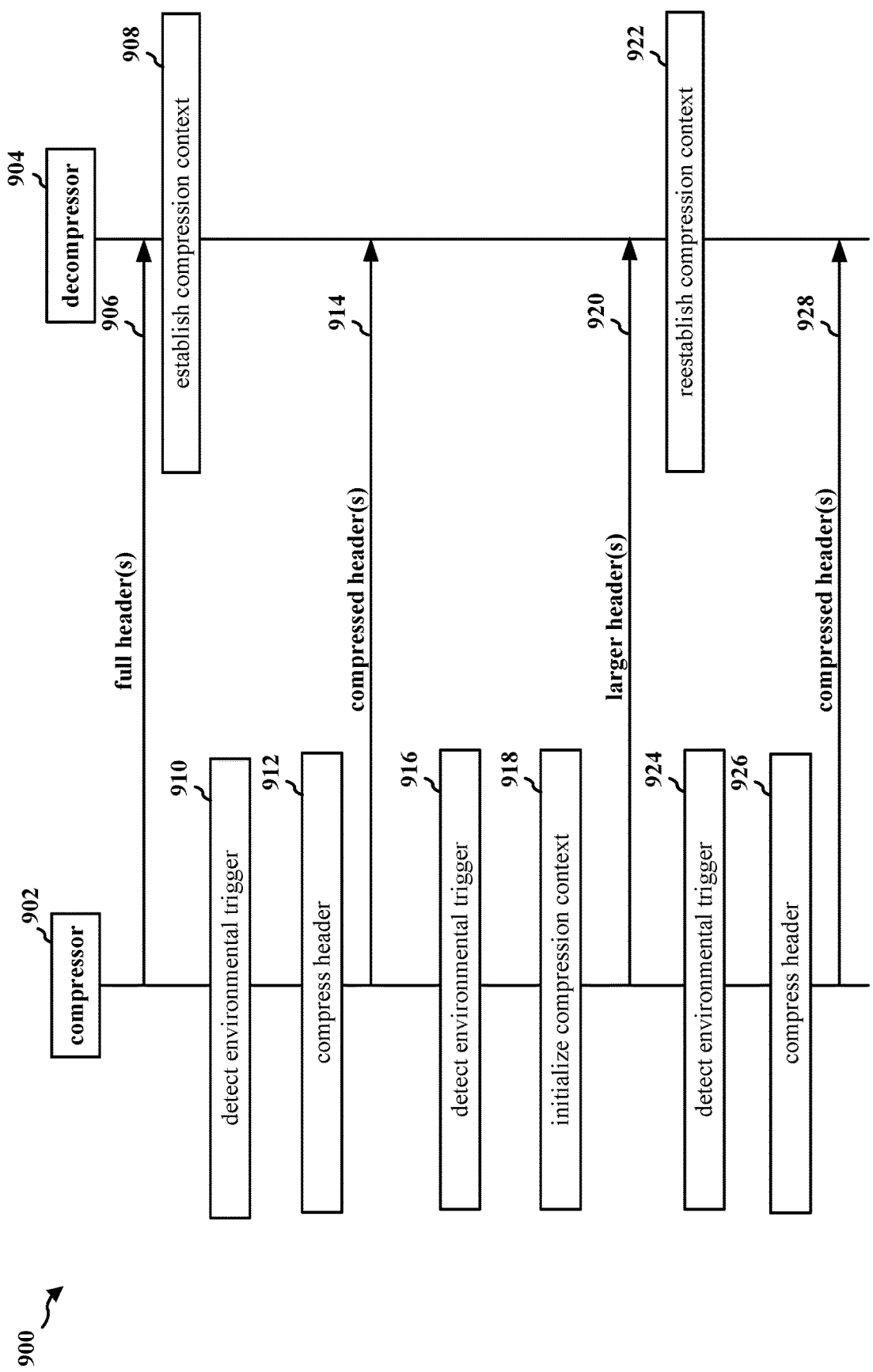
FIG. 9 shows a network connection flow diagram having a compressor and a decompressor configured to reestablish a compression context in response to detecting an environmental trigger.

In some aspects, a compressor may be configured to initialize the compression context in response to a contextual trigger. In FIG. 9, a network connection flow diagram 900 shows a compressor 802 and a decompressor 804 configured to reestablish a compression context in response to detecting an environmental trigger. The compressor 902 and the decompressor 904 may be similar to the compressor 802 and the decompressor 804 in FIG. 8. Similar to the full headers 806 in FIG. 8, the compressor 902 may output one or more full headers 906 to the decompressor 904. Similar to 808 in FIG. 8, at 908 the decompressor 904 may establish a compression context, for example by receiving an ACK or by obtaining confirmation that a compression context is established based on a variable (e.g. number of full headers transmitted) reaching a threshold value. At 910, the compressor 902 may be configured to detect an environmental trigger that indicates that the decompressor 904 established a compression context. For example, the compressor 902 may detect that a threshold number of full headers 906 have been output to the decompressor 904 by the compressor 902, or may detect a threshold number of ACKs obtained from the decompressor 904. In response to detecting the environmental trigger at 910, at 912, the compressor 902 may be configured to output one or more compressed headers 914 to the decompressor 904. The decompressor 904 may then be configured to decompress a compressed header 914 based upon the compression context established. For example, the decompressor 904 may be configured to derive an RTP SN based on the PDCP SN of a PDCP header (e.g. the four LSBs of the PDCP SN). At 916, the compressor 902 may detect an environmental trigger that indicates that a new compression context needs to be established. For example, the compressor 902 may obtain a NACK from the decompressor 904, may determine a beginning of a talk spurt/burst or an SID spurt/burst, or may determine that a new reference set of most significant bits (MSBs) of the RTP SN needs to be transmitted to the decompressor 904 to concatenate with the compressed RTP SN field 725 in FIG. 7. For example, the compressor 902 may be configured to transmit voice headers as the full headers 906 and the compressed headers 914 every 20 ms, and may be configured to later transmit SID headers as the larger headers 920 and the compressed headers 928 every 160 ms. In response to detecting an environmental trigger that the compression context needs to be updated at 916, at 918 the compressor 902 may initialize the compression context.

The compressor 902 may output one or more larger headers 920 to the decompressor 904 to update the compression context at the decompressor 904. For example, the compressor 902 may change a pitch of an RTP timestamp for an SID as compared to a voice packet (e.g., from 20 ms to 160 ms). At 922, the decompressor 904 may reestablish a compression context, such as a new ROHC header for an SID transmission from the compressor 902.

At 924, the compressor 902 may again detect an environmental trigger that the decompressor 904 has reestablished the compression context, for example by receiving an ACK signal or by determining that a threshold number of larger headers 920 have been output to the decompressor 904. At 926, the compressor 902 may compress the headers and may output one or more compressed headers 928 to the decompressor 904.

Figure 10:
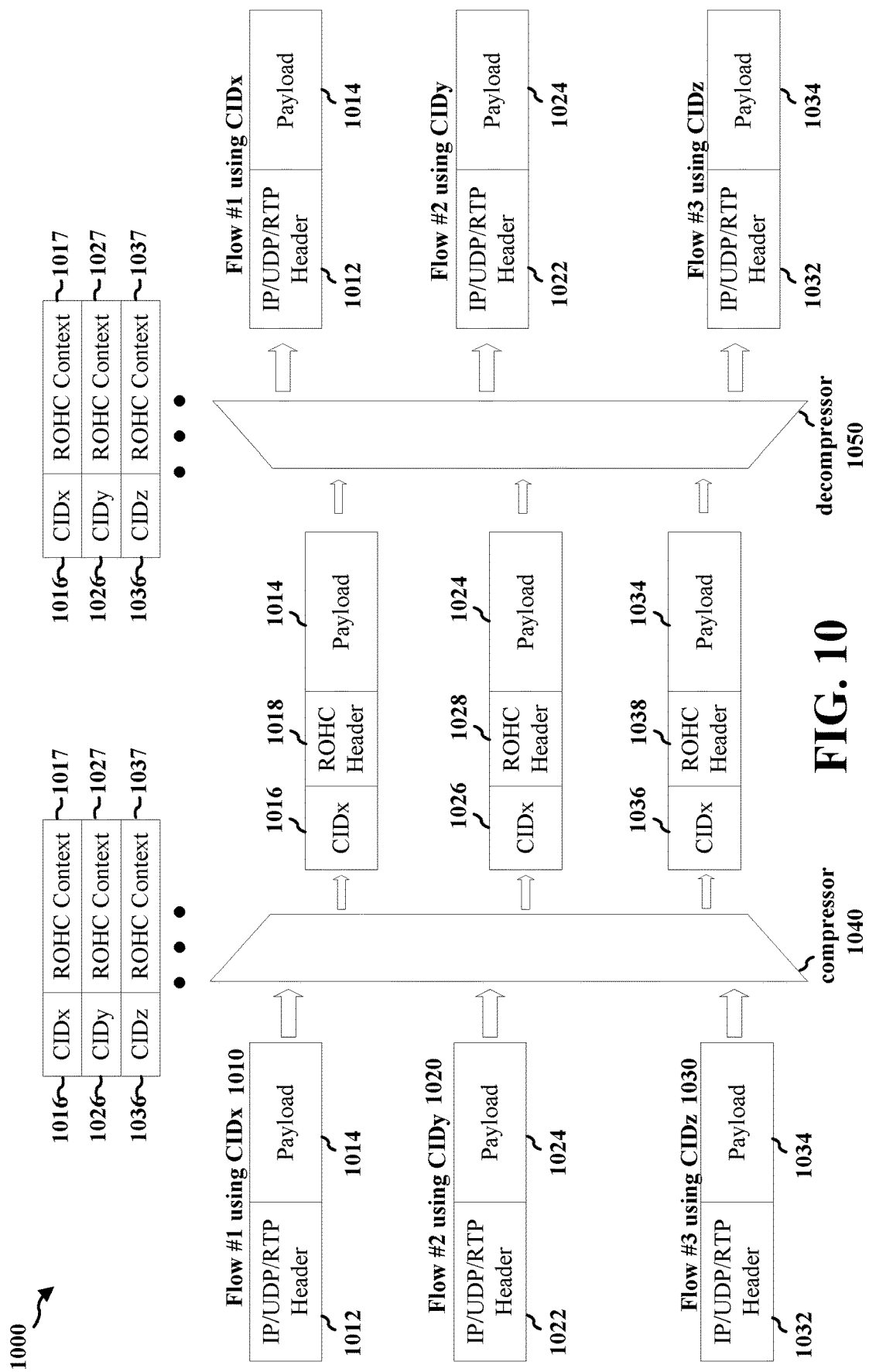
FIG. 10 shows a diagram illustrating a plurality of flows from a compressor to a decompressor.

A compressor may be configured to maintain a plurality of ROHC headers using a plurality of CIDs, one for each flow. FIG. 10 shows a diagram 1000 illustrating a plurality of flows, flow #1 1010, flow #2 1020, and flow #3 1030, from a compressor 1040 to a decompressor 1050. Flow #1 1010 has an IP/UDP/RTP header 1012 and a payload 1014 configured to be output to a decompressor 1050 from a compressor 1040. Flow #2 1020 has an IP/UDP/RTP header 1022 and a payload 1024 configured to be output to a decompressor 1050 from a compressor 1040. Flow #3 1030 has an IP/UDP/RTP header 1032 and a payload 1034 configured to be output to a decompressor 1050 from a compressor 1040. A PDCP entity may be configured to maintain multiple ROHC contexts, where each ROHC context may be identified by a CID.

The compressor 1040 may identify an ROHC context 1017 using CIDx 1016 for flow #1 1010, may identify an ROHC context 1027 using CIDy 1026 for flow #2 1020, and may identify an ROHC context 1037 using CIDz 1036 for flow #3 1030. The compressor 1040 may be configured to process the data for each of the flows, using the CIDs to identify the context. The CID may be output from the compressor 1040 with the compressed flow, such that the ROHC header 1018 and payload 1014 of flow #1 1010 is output with CIDx 1016, the ROHC header 1028 and payload 1024 of flow #2 1020 is output with CIDy 1026, and the ROHC header 1038 and payload 1034 of flow #3 1030 is output with CIDz 1036.

The decompressor 1050 may be similarly configured to process the data by identifying an ROHC context 1017 using CIDx 1016 for flow #1 1010, identifying an ROHC context 1027 using CIDy 1026 for flow #2 1020, and identifying an ROHC context 1037 using CIDz 1036 for flow #3 1030. Each of the ROHC context 1017, ROHC context 1027, and the ROHC context 1037 may be distinct with its own static/dynamic ROHC data context established independently from one another. The decompressor 1050 may be configured to decompress each of the ROHC headers for each of the flows accordingly, such that the decompressor 1050 decompresses the ROHC header 1018 of flow #1 1010 to the IP/UDP/RTP header 1012 for the payload 1014, the decompressor 1050 decompresses the ROHC header 1028 of flow #2 to the IP/UDP/RTP header 1022 for the payload 1024, and the decompressor 1050 decompresses the ROHC header 1038 of flow #1 1030 to the IP/UDP/RTP header 1032 for the payload 1034. The multiple ROHC contexts, ROHC context 1017, ROHC context 1027, and ROHC context 1037, may be maintained by one PDCP entity and may share the same RB.

Figure 11:
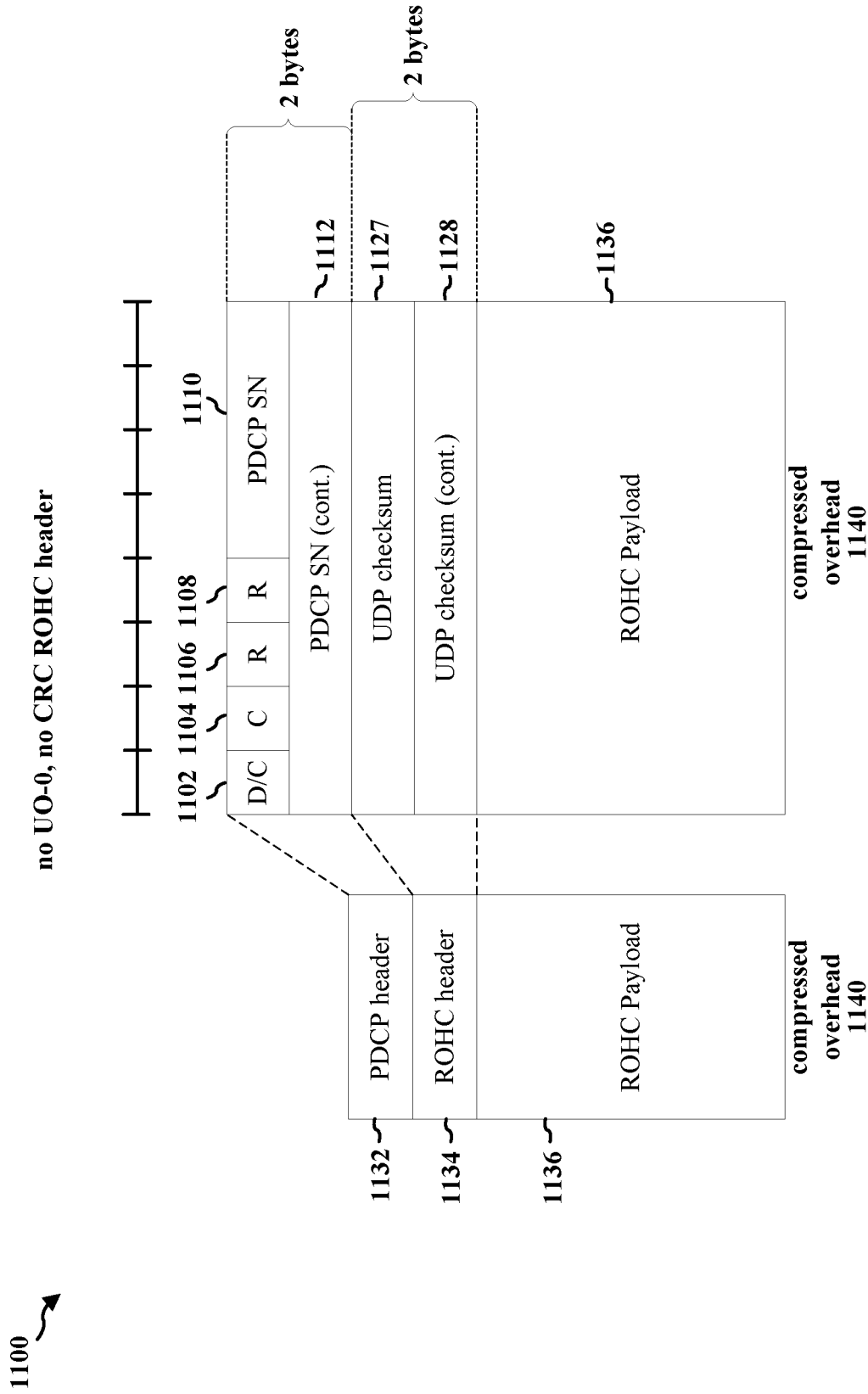
FIG. 11 shows a diagram of an example compressed overhead having a ROHC header without a UO-0 header.

Additional overhead savings may be realized by removing the 1-byte UO-0 header from a ROHC header, such as the 1-byte UO-0 header 622 from the ROHC header 621 in FIG. 6. FIG. 11 shows a diagram 1100 of a compressed overhead 1140 having a ROHC header 1134 without a UO-0 header. The compressed overhead 1140 in FIG. 11 shares some similarities to the compressed overhead 740 in FIG. 7. For example, the PDCP header 1132, ROHC payload 1136, D/C field 1102, reserved field 1106, reserved field 1108, PDCP SN field 1110, PDCP SN field 1112, UDP field 1127, and UDP field 1128 in FIG. 11 may be similar to the PDCP header 732, ROHC payload 736, D/C field 702, reserved field 706, reserved field 708, PDCP SN field 710, PDCP SN field 712, UDP field 727, and UDP field 728 in FIG. 7, respectively. However, the ROHC header 1134 in FIG. 11 is configured to store 2-bytes of data whereas the ROHC header 734 in FIG. 7 is configured to store 3-bytes of data. The ROHC header 1134 may not have a UO-0 header having a compressed RTP SN field and a CRC

FIELD

The PDCP header may have a C field 1104 that may be used to indicate whether PDCP SN based compression is applied. For example, a 1 flag may be used to indicate that the ROHC header 1134 does not have a UO-0 header (is only 2 bytes when UDP checksum exists), and a 0 flag may be used to indicate that the ROHC header 1134 has a UO-0 header (is 3 bytes). A decompressor receiving such a PDCP PDU may be configured to analyze the ROHC header in response to a setting of the C field 1104, such that the decompressor reviews the ROHC header 1134 for a UO-0 header having a compressed RTP SN field and CRC field when the C field 1104 is set to 0 and does not review the ROHC header 1134 for a UO-0 header when the C field 1104 is set to 1.

A decompressor receiving the ROHC header 1134 in FIG. 11 without the UO-0 header may be configured to derive the RTP SN from other information, since the compressed RTP SN is not provided in a UO-0 header, and the RTP SN may be needed to encode/decode a payload. In one aspect, the compressor and the decompressor may be configured to associate the RTP SN value to a reference value that is also incremented, such that the RTP SN value is incremented when the reference value is incremented. The reference value may be any suitable value that may be incremented with the RTP SN, such as the PDCP SN, a count value based on the PDCP SN (e.g., a count value having a Hyper Frame Number and a PDCP SN), or an arbitrary count value. In other words, the compressor may be configured to ensure that the RTP SN increments every time the reference value increments, such that they are synchronized with one another as much as possible. The reference value may be longer than the 4-bit compressed RTP SN field 725 in FIG. 7. For example, the reference value may be the 12-bit PDCP SN saved in PDCP SN field 1110 and PDCP SN field 1112 in FIG. 11. By using a longer reference value, the protocol overhead reduction system may provide additional robustness against packet loss over the air, since the UO-0 header 622 in FIG. 6 may only recover 15 packet loss (since the compressed RTP SN field 625 in FIG. 6 is 4 bits long), but the PDCP SN field 1112 may provide 2147 packet loss (since the PDCP SN field 1112 and PDCP SN field 1110 collectively provide 12 bits of indication).

Figure 12:
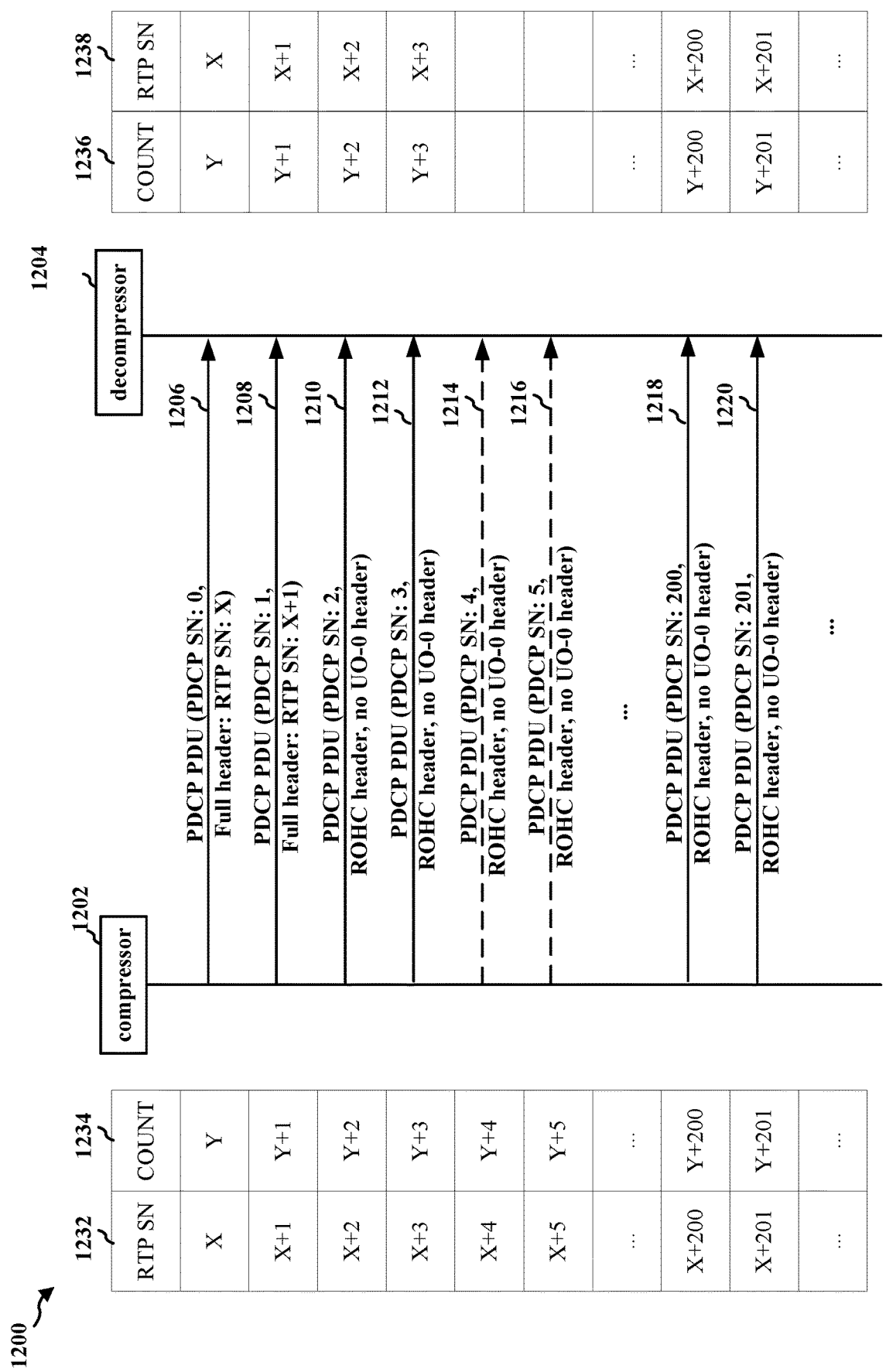
FIG. 12 shows a network connection flow diagram having a compressor and a decompressor configured to establish a compression context using a reference count value.

In FIG. 12, a network connection flow diagram 1200 shows a compressor 1202 and a decompressor 1204 configured to establish a compression context using a reference count value 1234, 1236. The reference count value may be any suitable number, such as the PDCP SN, an internal variable initialized by the compressor 1202 and the decompressor 1204, or any other variable set to increment with the RTP SN. The compressor 1202 may have an RTP SN 1232 used to encode packet payloads and a reference count value 1234 that is configured to increment with the RTP SN 1232, such as the PDCP SN. The compressor 1202 may be configured to ensure that, as the RTP SN 1232 increments, the count value 1234 also increments.

While both the count value 1234 and the RTP SN 1232 are shown as incrementing by 1 in step with one another, the compressor 1202 may ensure that the count value 1234 and the RTP SN 1232 increment by any consistent value in step with one another. For example, the RTP SN 1232 may be configured to increment by 1 for each packet and the count value 1234 may be configured to increment by 3 for each packet, or the RTP SN 1232 may be configured to increment by 1 for each packet and the count value 1234 may be configured to increment by 20 for each packet. So long as both increment in step with one another, the decompressor 1204 may use the count value to determine the RTP SN value.

The compressor 1202 may be configured to transmit a transmission 1206 including a full header to the decompressor 1204, and transmit a transmission 1208 including a full header to the decompressor 1204. The decompressor 1204 may receive the full RTP SN in each of the full headers in transmissions 1206 and 1208, which may be 16 bits long. The decompressor 1204 may also track a count value 1236 with the RTP SN 1238. Since the decompressor 1204 receives the full 16-bit RTP SN with the transmission 1206 and the transmission 1208, the decompressor 1204 may verify that the count value 1236 increments when the RTP SN 1238 increments, and may verify the proportional amount that the count value 1236 increments as compared to the proportional amount that the RTP SN 1238 increments (i.e., the Δ difference that each increments). For example, where the count value 1234 is the PDCP SN and the RTP SN 1238 for the transmission 1206 is 256 and the RTP SN 1238 for the transmission 1208 is 257, the decompressor 1204 may learn that the count value 1236 (the PDCP SN) and the RTP SN 1238 both increment by 1 for each received transmission. Here, the decompressor 1204 may be configured to determine that the RTP SN 1238=X+("count value 1236 of received PDU"−Y).

After the decompressor 1204 receives the transmission 1206 with a full header and the transmission 1208 with a full header, the decompressor 1204 may have established the compression context based on a learned pattern. The compressor 1202 may determine that the decompressor 1204 has established the compression context (e.g., by obtaining an ACK from the decompressor 1204, or by obtaining another confirmation that a compression context is established) and may then output a transmission 1210 without a UO-0 header that contains a compressed RTP SN value. However, the decompressor 1204 may still receive a count value 1236 (e.g., the PDCP SN) with the transmission 1210, which the decompressor 1204 may use to derive the corresponding RTP SN 1238 for the transmission 1210, incrementing the RTP SN from the transmission 1206 by 2.

Likewise, the compressor 1202 may also output a transmission 1212 without a UO-0 header, but the decompressor 1204 may still receive a count value 1236 (e.g., the PDCP SN) with the transmission 1212, which the decompressor 1204 may use to derive the corresponding RTP SN 1238 for the transmission 1212, incrementing the RTP SN from the transmission 1206 by 3.

The decompressor 1204 may even lose some data packets. The compressor 1202 may output a transmission 1214 without a UO-0 header, but the decompressor 1204 may not receive that transmission. The compressor 1202 may also output a transmission 1216 without a UO-0 header, but the decompressor 1204 may not obtain that transmission.

The decompressor 1204 may not obtain many transmissions from RTP SN X+4 to RTP SN X+199 that are output by the compressor 1202, and later the compressor 1202 may output a transmission 1218 without a UO-0 header and the decompressor 1204 may receive the transmission 1218 having a count value that corresponds with an increment of 200 to the RTP SN 1238 of transmission 1206. The decompressor 1204 may then increment the RTP SN 1238 and may successfully decode the packet using the incremented RTP SN 1238 without needing to transmit a NACK to the compressor 1202 to reinitialize the compression context. The compression context established by the decompressor 1204 after receiving the transmission 1208 is still valid even after missing almost 200 transmissions. Likewise, the compressor 1202 may output a transmission 1220 without a UO-0 header and the decompressor 1204 may receive the transmission 1220 having a count value that corresponds with an increment of 201 to the RTP SN 1238 of transmission 1206.

While the example in network connection flow diagram 1200 may use a count value that corresponds with the PDCP SN, any suitable reference count value and corresponding formula to increment the RTP SN with an incrementing reference count value may be used by a count in other aspects. For example, the decompressor 1204 may determine that the RTP SN=Initial value of RTP SN+(count value mod 16), as the RTP SN is 16 bits long. In another aspect, the decompressor 1204 may determine that the RTP SN= (RTP SN of the last/previous PDCP PDU which was received from lower layer or delivered to upper layer)+ (count value of the received PDCP PDU)–(count value of the last/previous PDCP PDU which was received from lower layer or delivered to upper layer). In other words, incrementing the previously known RTP SN by the difference in a count value associated with the PDCP PDU. In another aspect, the decompressor 1204 may determine that the RTP SN=(RTP SN of the last/previous PDCP PDU which includes certain ROHC header format type)+(count value of the received PDCP PDU)–(count value of the last/previous PDCP PDU which includes certain ROHC header format type). In other words, incrementing the previously known RTP SN by the difference in a count value associated with a certain type of ROHC header format. The ROHC header format may be, for example, an IR header, an initialization and refresh dynamic part (IR-DYN) header, a packet type 1, or a packet type 2. In another aspect, the decompressor 1204 may determine that the compressed RTP SN=4 LSBs of PDCP SN. In other words, the decompressor 1204 may derive the compressed RTP SN that would normally be included in the 4 bits of compressed RTP SN field 725 in FIG. 7 by taking the current PDCP SN and applying a mod 16.

In another aspect, the decompressor 1204 may determine that the RTP SN=(RTP SN of the last/previous PDCP PDU which was received from lower layer or delivered to upper layer)+(count value mod 16 of the received PDCP PDU)– (count value mod 16 of the last/previous PDCP PDU which was received from lower layer or delivered to upper layer). In other words, incrementing the previously known RTP SN by the difference in a count value mod 16 associated with the PDCP PDU. In another aspect, the decompressor 1204 may determine that the RTP SN=(RTP SN of the last/previous PDCP PDU which includes certain ROHC header format type)+(count value mod 16 of the received PDCP PDU)– (count value mod 16 of the last/previous PDCP PDU which includes certain ROHC header format type). In other words, incrementing the previously known RTP SN by the difference in a count value mod 16 associated with a certain type of ROHC header format. In anther aspect, the decompressor 1204 may determine that the RTP SN=((RTP SN of the last/previous PDCP PDU which was received from lower layer or delivered to upper layer)+((count value of the received PDCP PDU)–(count value of the last/previous PDCP PDU which was received from lower layer or delivered to upper layer)) mod 16). In other words, incrementing the previously known RTP SN by the mod 16 of the difference in a count value associated with the PDCP PDU. In another aspect, the decompressor 1204 may determine that the RTP SN=((RTP SN of the last/previous PDCP PDU which includes certain ROHC header format)+((count value of the received PDCP PDU)–(count value of the last/previous PDCP PDU which includes certain ROHC header format)) mod 16). In other words, incrementing the previously known RTP SN by the mod 16 of the difference in a count value associated with a certain type of ROHC header format.

Any suitable machine learning or analysis may be used by the decompressor 1204 to determine a relationship between an RTP SN and a reference count value used by the decompressor 1204. The compressor 1202 may be configured to explicitly provide an RTP SN formula to the decompressor 1204 in a data field to render such an analysis unnecessary.

Figure 13:
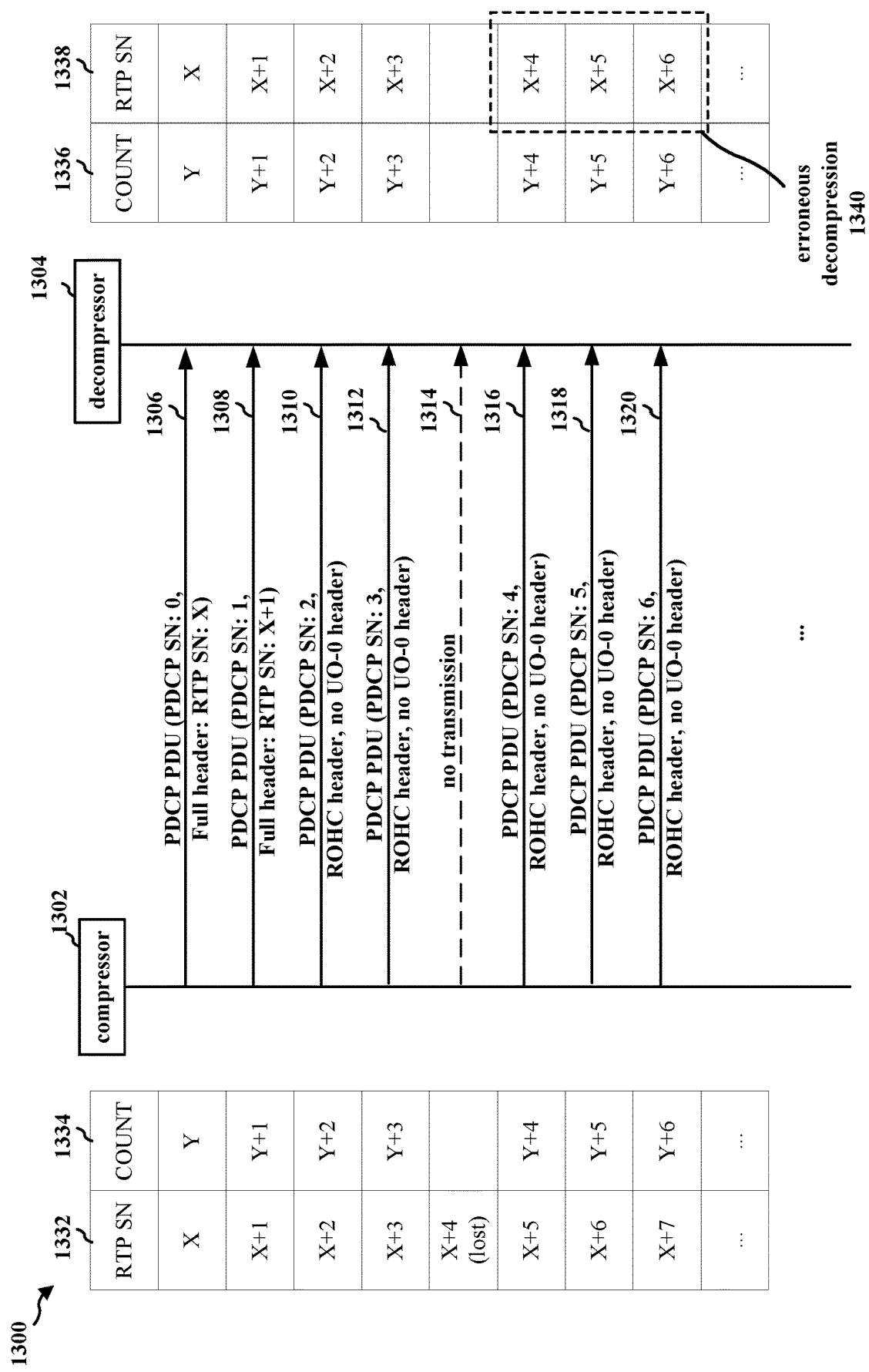
FIG. 13 shows a network connection flow diagram having a compressor and a decompressor that may become out of sync with one another due to a lost data packet of the compressor.

In some aspects, the compressor may lose some data packets, such as when the compressor is part of a network entity that is relaying data packets from one UE to another UE via a NTN. In FIG. 13, a network connection flow diagram 1300 shows a compressor 1302 and a decompressor 1304 that may become out of sync with one another due to a lost data packet of the compressor. The network connection flow diagram 1300 in FIG. 13 shares some similarities with the network connection flow diagram 1200 in FIG. 12. The compressor 1302, the decompressor 1304, the RTP SN 1332, the count value 1334, the count value 1336, the RTP SN 1338, the transmission 1306, the transmission 1308, the transmission 1310, and the transmission 1312 in FIG. 13 are similar to the compressor 1202, the decompressor 1204, the RTP SN 1232, the count value 1234, the count value 1236, the RTP SN 1238, the transmission 1206, the transmission 1208, the transmission 1210, and the transmission 1212 in FIG. 12. However, here the compressor 1302 does not receive a transmission having a payload that corresponds with the RTP SN X+4. A missing transmission 1314 may then create an erroneous decompression set of RTP SN values 1340 because the count values 1336 no longer match with the intended RTP SN 1338.

When the compressor 1302 outputs the transmission 1316 having no UO-0 header to the decompressor 1304, the decompressor 1304 may erroneously add only 4 to the RTP SN 1338 of the transmission 1306, where it should add 5. This may result in an erroneous decompression set of RTP SN values 1340. Likewise, the decompressor 1304 may erroneously decompress transmission 1318 and transmission 1320. Such errors may not be caught if the UDP checksum is not enabled. However, the compressor 1302 may be able to prevent such an error by informing the decompressor 1304. The compressor 1302 may determine that a packet loss has occurred in response to receiving an RTP SN 1332 of X+5 when the previously received RTP SN 1332 was X+3. When the compressor 1302 determines a packet loss has occurred, the compressor 1302 may be configured to adjust the contents of the next transmission to the decompressor 1304 to account for the packet loss.

Figure 14:
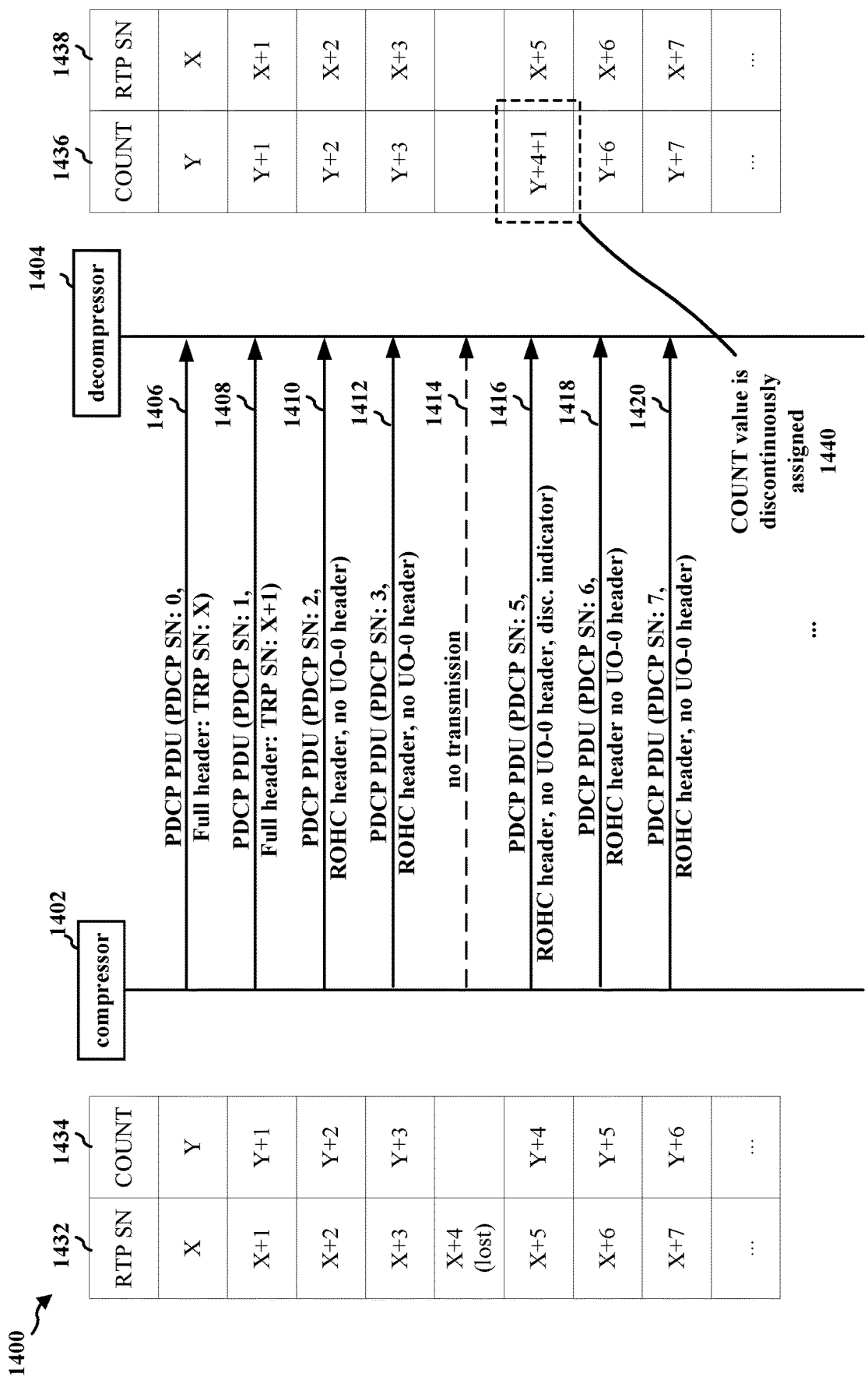
FIG. 14 shows a network connection flow diagram having a compressor and a decompressor that may become out of sync with one another due to a lost data packet of the compressor.

In FIG. 14, a network connection flow diagram 1400 shows a compressor 1402 and a decompressor 1404 that may become out of sync with one another due to a lost data packet of the compressor, where the compressor 1402 may output a discontinuous count value indicator to the decompressor 1404. The network connection flow diagram 1400 in FIG. 14 shares some similarities with the network connection flow diagram 1300 in FIG. 13. The compressor 1402, the decompressor 1404, the RTP SN 1432, the count value 1434, the count value 1436, the RTP SN 1438, the transmission 1406, the transmission 1408, the transmission 1410, the transmission 1412, and the missing transmission 1414 in FIG. 14 are similar to the compressor 1302, the decompressor 1304, the RTP SN 1332, the count value 1334, the count value 1336, the RTP SN 1338, the transmission 1306, the transmission 1308, the transmission 1310, the transmission 1312, and the missing transmission 1314 in FIG. 13. However, here the compressor 1402 may be configured to output a discontinuous count value indicator to the decompressor 1404 in transmission 1416 in response to determining that the count value 1434 is out of sync with the RTP SN 1432 at X+5. The discontinuous count value indicator may be output using a reserved field, such as the reserved field 1106 of PDCP header 1132 in FIG. 11. The discontinuous count value indicator may be configured to transmit a value larger than one, for example where the compressor 1402 determines that a plurality of payloads have been lost.

In response to receiving the discontinuous count value indicator in the transmission 1416, the decompressor 1404 may be configured to increment the count value 1436 by a specified amount at 1440, such that the RTP SN 1438 is incremented appropriately. While the decompressor 1404 is shown as configured to increment the count value 1436 by 1, the decompressor 1404 may be configured to increment the count value 1436 by any suitable amount in response to receiving a discontinuous count value indicator. In network connection flow diagram 1400, in response to the compressor 1402 outputting the transmission 1416 having no UO-0 header to the decompressor 1404 with the discontinuous count value indicator, the decompressor 1404 will correctly add 5 to the RTP SN 1438 of the transmission 1406 instead of incorrectly adding 4. Likewise, the decompressor 1304 may correctly decompress transmission 1418 and transmission 1420 due to the count value 1436 being fixed using the discontinuous count value indicator send in the transmission 1416. While the compressor 1402 may be able to rapidly fix a count value 1436 of the decompressor 1404 using a discontinuous count value indicator in transmission 1416, if the compressor 1402 loses a number of transmissions greater than the discontinuous count value indicator may account for, then the count value 1436 of the decompressor 1404 may not be able to be rapidly fixed.

Figure 15:
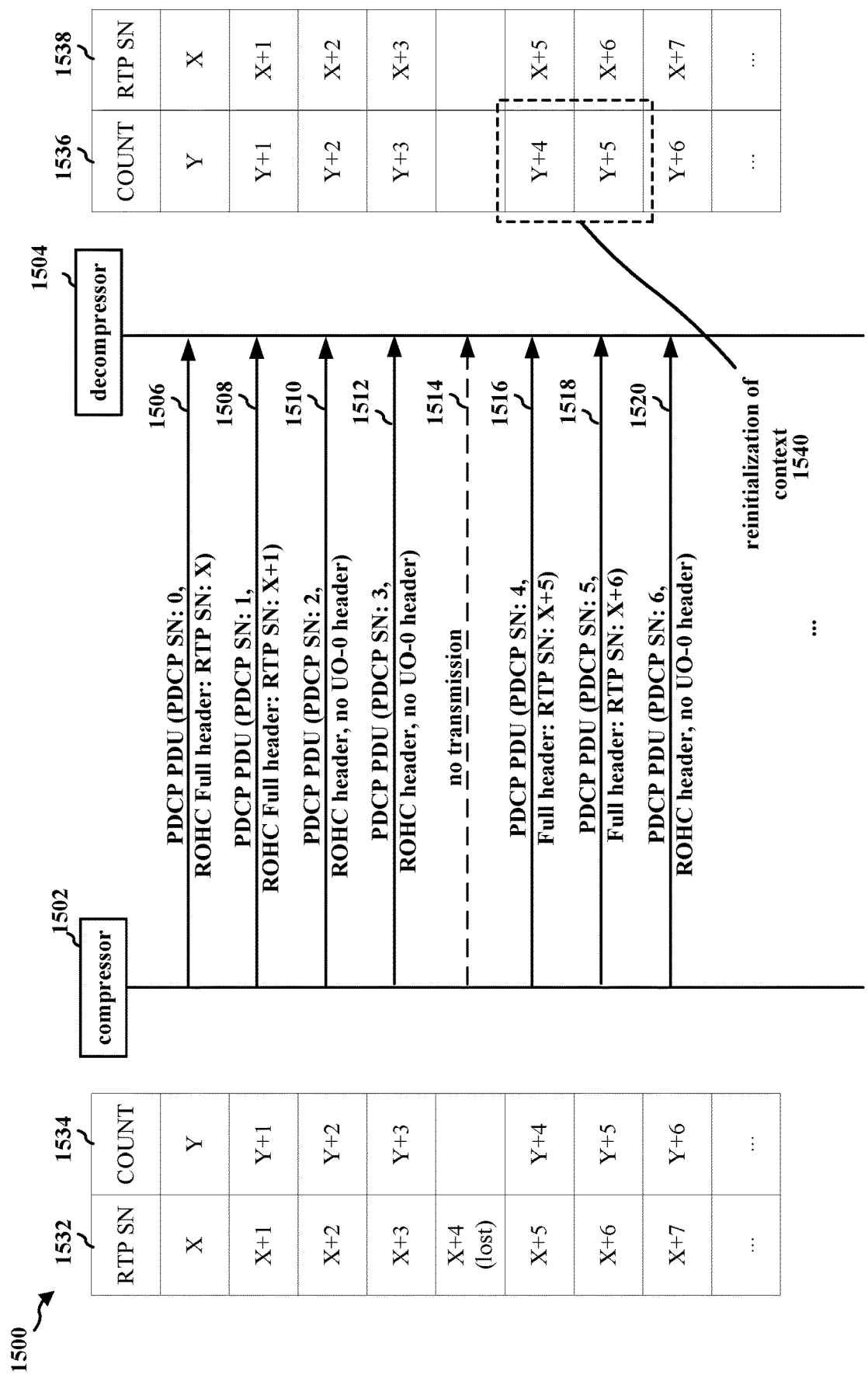
FIG. 15 shows an alternative network connection flow diagram having a compressor and a decompressor that may become out of sync with one another due to a lost data packet of the compressor.

In FIG. 15, a network connection flow diagram 1500 shows a compressor 1502 and a decompressor 1504 that may become out of sync with one another due to a lost data packet of the compressor, where the compressor 1502 may output a full header to reinitialize the compression context of the decompressor 1504. The network connection flow diagram 1500 in FIG. 15 shares some similarities with the network connection flow diagram 1300 in FIG. 13. The compressor 1502, the decompressor 1504, the RTP SN 1532, the count value 1534, the count value 1536, the RTP SN 1538, the transmission 1506, the transmission 1508, the transmission 1510, the transmission 1512, and the missing transmission 1514 in FIG. 15 are similar to the compressor 1302, the decompressor 1304, the RTP SN 1332, the count value 1334, the count value 1336, the RTP SN 1338, the transmission 1306, the transmission 1308, the transmission 1310, the transmission 1312, and the missing transmission 1314 in FIG. 13, respectively. Once the decompressor 1504 receives the transmission 1508, the decompressor 1504 may be configured to determine that the RTP SN 1538=X+ ("count value 1536 of received PDU"−Y). The compressor 1502 may then determine that a packet was when RTP SN 1532 is X+5. However, here the compressor 1502 may be configured to output a full header to the decompressor 1504 in transmission 1516 and transmission 1518 in response to determining that the count value 1534 is out of sync with the RTP SN 1532.

The compressor 1502 may be configured to output a full header to reinitialize the compression context of the decompressor 1504 and ensure that the RTP SN 1538 is being correctly calculated by the decompressor 1504. Here, upon obtaining the transmission 1516 including the full header with the full RTP SN, the decompressor 1504 may update the compression context (i.e., a relationship between an RTP SN and a reference count value). When the decompressor 1504 receives the transmission 1518 with the second RTP SN 1538 and the second count value, the decompressor 1504 may use a new formula to calculate the RTP SN 1538. At 1540, the decompressor 1504 may reinitialize the context and determine that the RTP SN 1538=X+("count value 1536 of received PDU"−Y)+1. When the decompressor 1504 then receives the transmission 1520 without the UO-0 header, the decompressor 1504 may then properly increment the RTP SN 1538 to properly decompress the payload.

While the network connection flow diagram 1500 shows the compressor 1502 outputting the full header to the decompressor in transmission 1516 and transmission 1518, the compressor 1502 may be configured to output a mid-sized header containing the full 16-bits of the RTP SN without needing to output the full header. Such an optimized output minimizes overhead while still allowing the decompressor 1504 to reinitialize its compression context.

Figure 16:
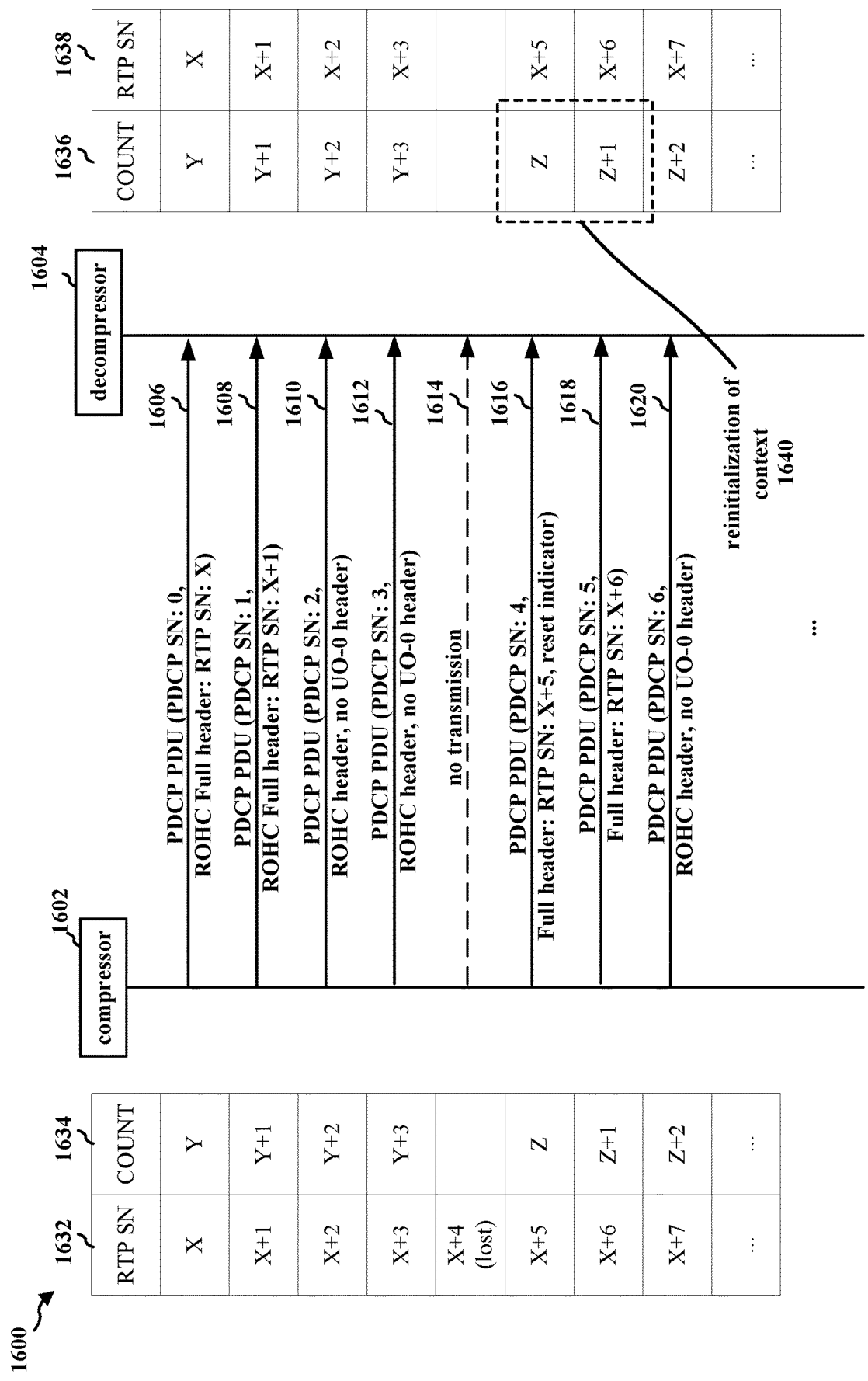
FIG. 16 shows an alternative network connection flow diagram having a compressor and a decompressor that may become out of sync with one another due to a lost data packet of the compressor.

In FIG. 16, a network connection flow diagram 1600 shows a compressor 1602 and a decompressor 1604 that may become out of sync with one another due to a lost data packet of the compressor, where the compressor 1602 may output a full header to reinitialize the compression context of the decompressor 1604. The network connection flow diagram 1600 in FIG. 16 shares some similarities with the network connection flow diagram 1300 in FIG. 13. The compressor 1602, the decompressor 1604, the RTP SN 1632, the count value 1634, the count value 1636, the RTP SN 1638, the transmission 1606, the transmission 1608, the transmission 1610, the transmission 1612, and the missing transmission 1614 in FIG. 16 are similar to the compressor 1302, the decompressor 1304, the RTP SN 1332, the count value 1334, the count value 1336, the RTP SN 1338, the transmission 1306, the transmission 1308, the transmission 1310, the transmission 1312, and the missing transmission 1314 in FIG. 13, respectively. Once the decompressor 1604 receives the transmission 1608, the decompressor 1604 may be configured to determine that the RTP SN 1638=X+ ("count value 1636 of received PDU"−Y). The compressor 1602 may then determine that a packet was when RTP SN 1632 is X+5. However, here the compressor 1602 may be configured to output a full header to the decompressor 1604 and a reset indicator in transmission 1616 in response to determining that the count value 1634 is out of sync with the RTP SN 1632.

The compressor 1602 and the decompressor 1604 may be configured to reset the count value 1534 and count value 1536, respectively, to reinitialize the compression context and ensure that the RTP SN 1638 is being correctly calculated by the decompressor 1604. For example, upon obtaining the transmission 1616 including the full header with the full RTP SN and the reset indicator, the decompressor 1604 may reset the count value 1636 to a new count value Z and start incrementing from the initialization and determine a new relationship between the count value 1636 at transmission 1616. When the decompressor 1604 receives the transmission 1618 with the second RTP SN 1638 and the second count value, the decompressor 1604 may use a new formula to calculate the RTP SN 1638, using the initialized Z value instead of the X value. For example, the decompressor 1604 may reinitialize the context at 1640 and determine that the RTP SN 1638=Z+("count value 1636 of received PDU"−Z)+5. When the decompressor 1604 then receives the transmission 1620 without the UO-0 header, the decompressor 1604 may then properly increment the RTP SN 1638 to properly decompress the payload. The compressor 1602 may be configured to transmit a count value reset command (or request) to the decompressor 1604 with the transmission 1616. The compressor 1602 may be configured to output the count value reset command (or request) to the decompressor 1604 to re-initialize or reset the count value 1636 in response to receiving the reset indicator in the transmission 1616. In response to receiving the reset indicator, the decompressor 1604 may also be configured to trigger an RRC re-establishment procedure that resets and/or flushes the compression context of the decompressor 1604, triggers an RRC connection release (command or request), and/or triggers a bearer removal and addition request (e.g., a full configuration to remove the dedicated configuration).

In one aspect, the compressor and the decompressor may be configured to ensure that one PDCP entity handles one RTP flow max when using a compression context that does not have a header that stores an RTP SN, such that an RB is not shared by multiple different flows. For example, a compressor and a decompressor may be configured to ensure that a first RTP flow, a real-time transport protocol (RTCP) flow, and another RTP flow are each handled by different RBs. In one aspect, a compressor and a decompressor may use two different data RBs (DRBs) for two different flows, such as one for RTP and another for RTCP. In response to a new flow for the compressor, the compressor may create and/or establish a new RB for the new flow. Such a new flow may be triggered by determining that the IP/UDP/RTP header for the new flow does not match any of the IP/UDP/RTP for which the compression context has been already established in the compressor.

Figure 17:
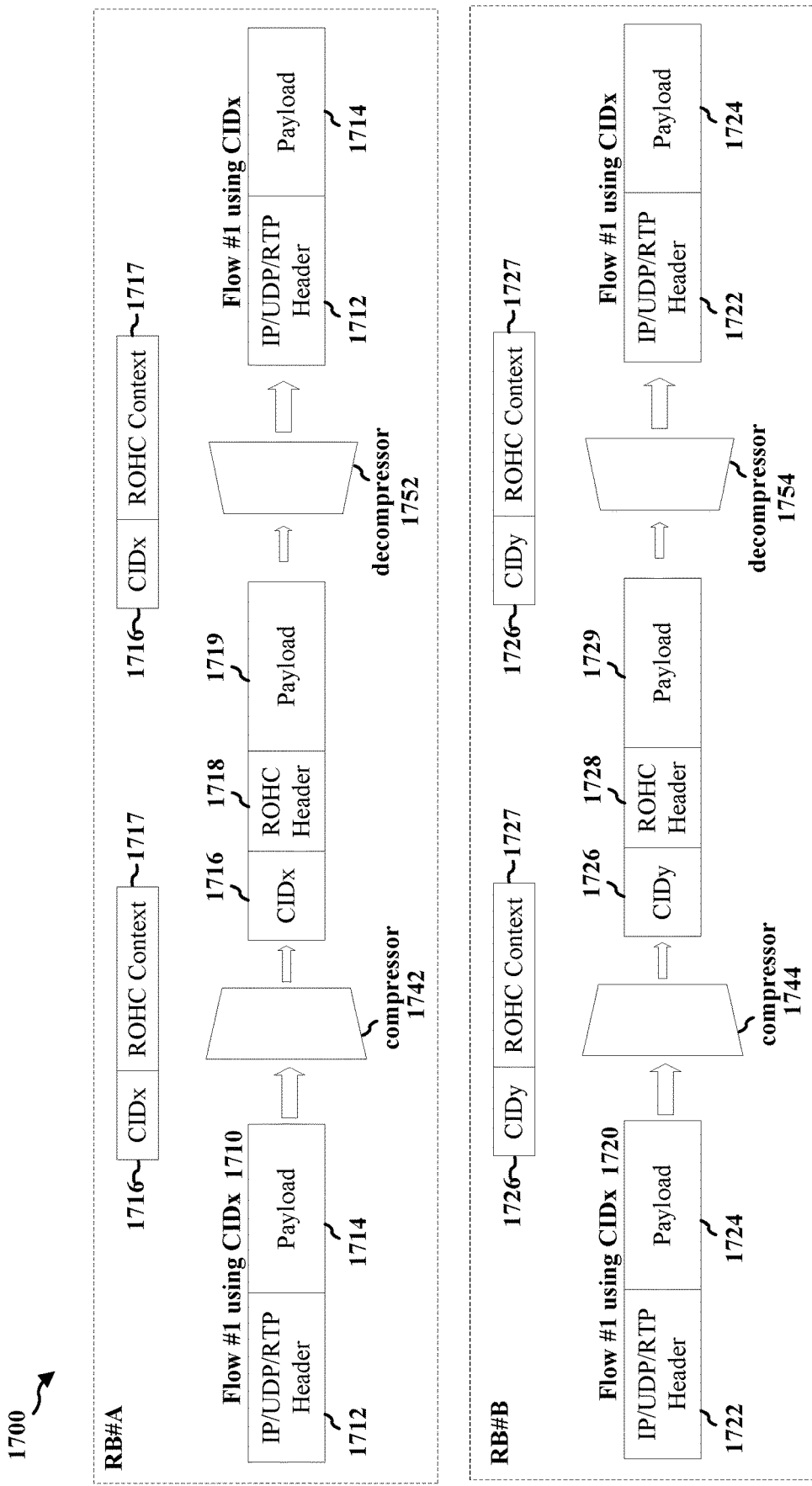
FIG. 17 shows a diagram illustrating a plurality of flows among compressors and decompressors of different RBs.

FIG. 17 shows a diagram 1700 illustrating a plurality of flows, flow #1 1710 from a compressor 1742 to a decompressor 1752, and flow #2 1720 from a compressor 1744 to a decompressor 1754. Each of the flows is scheduled for a different RB. Flow #1 1710 is scheduled for RB #A and flow #2 1720 is scheduled for RB #B. The compressors and decompressors may be configured to ensure that one PDCP entity handles one flow max. In this case, a predetermined CID may be used, e.g., CID=0. Flow #1 1710 has an IP/UDP/RTP header 1712 and a payload 1714 configured to be output to a decompressor 1752 from a compressor 1742. The compressor 1742 may identify an ROHC context 1717 using CIDx 1716 for flow #1 1710. The CID may be output from the compressor 1742 with the compressed flow, such that the ROHC header 1718 and payload 1719 of flow #1 1710 is output with CIDx 1716. The decompressor 1752 may be configured to decompress the ROHC header 1718 and the payload 1719 of flow #1 1710 to the IP/UDP/RTP header 1712 and the payload 1714, respectively, using the CIDx 1716.

Flow #2 1720 has an IP/UDP/RTP header 1722 and a payload 1724 configured to be output to a decompressor 1754 from a compressor 1744. The compressor 1744 may identify an ROHC context 1727 using CIDy 1726 for flow #2 1720. The CID may be output from the compressor 1744 with the compressed flow, such that the ROHC header 1728 and payload 1729 of flow #2 1720 is output with CIDy 1726. The decompressor 1754 may be configured to decompress the ROHC header 1728 and the payload 1729 of flow #2 1720 to the IP/UDP/RTP header 1722 and the payload 1724, respectively, using the CIDy 1726.

Figure 18:
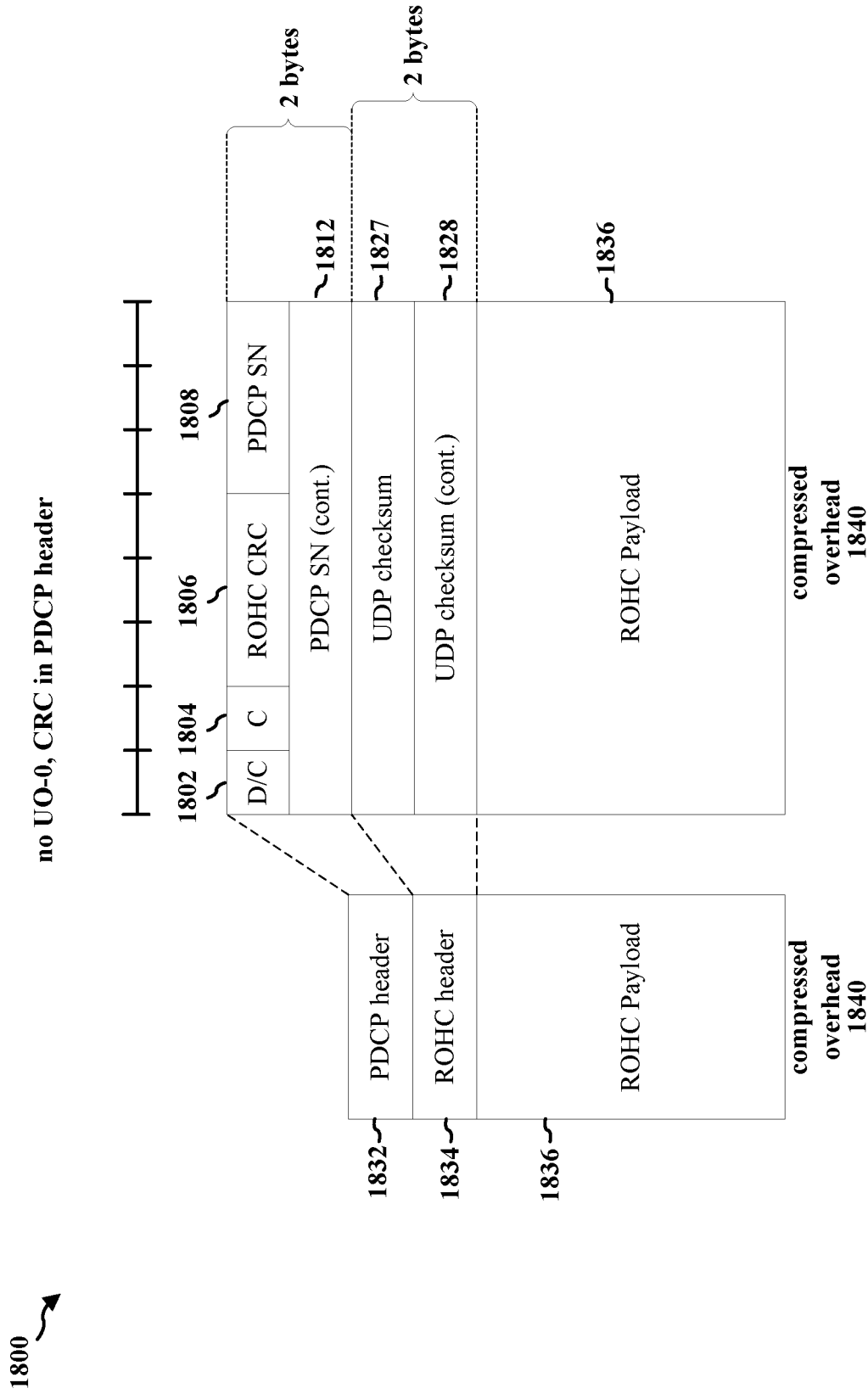
FIG. 18 shows a diagram of a compressed overhead having a ROHC header without a UO-0 header, but with the CRC transmitted in the PDCP header.

FIG. 18 shows a diagram 1800 of a compressed overhead 1840 having a ROHC header 1834 without a UO-0 header, but with the CRC transmitted in the PDCP header 1832. The compressed overhead 1840 in FIG. 18 shares some similarities to the compressed overhead 1140 in FIG. 11. For example, the ROHC payload 1836, D/C field 1802, C field 1804, PDCP SN 1812, UDP field 1827, and UDP field 1828 in FIG. 18 may be similar to ROHC payload 1136, D/C field 1102, C field 1104, PDCP SN field 1112, UDP field 1127, and UDP field 1128 in FIG. 11, respectively. However, the PDCP header 1832 in FIG. 18 is configured to store 3-bits of a CRC in the ROHC CRC field 1806 and only 3-bits of the PDCP SN in the PDCP SN field 1808, as opposed to the 4-bits in the PDCP SN field 1110 in FIG. 11.

While the compressed overhead 1840 shortens the effective PDCP SN from 12 bits to 11 bits, the compressed overhead 1840 allows for a ROHC CRC to be transmitted while still saving 1 byte of space by not transmitting the UO-0 header with the ROHC header 1834. Providing the CRC in the PDCP header 1832 improves the robustness by allowing a receiving device to detect residual errors in a layer 1 CRC while still saving 1 byte of space by not transmitting the UO-0 header in the ROHC header 1834.

Figure 19:
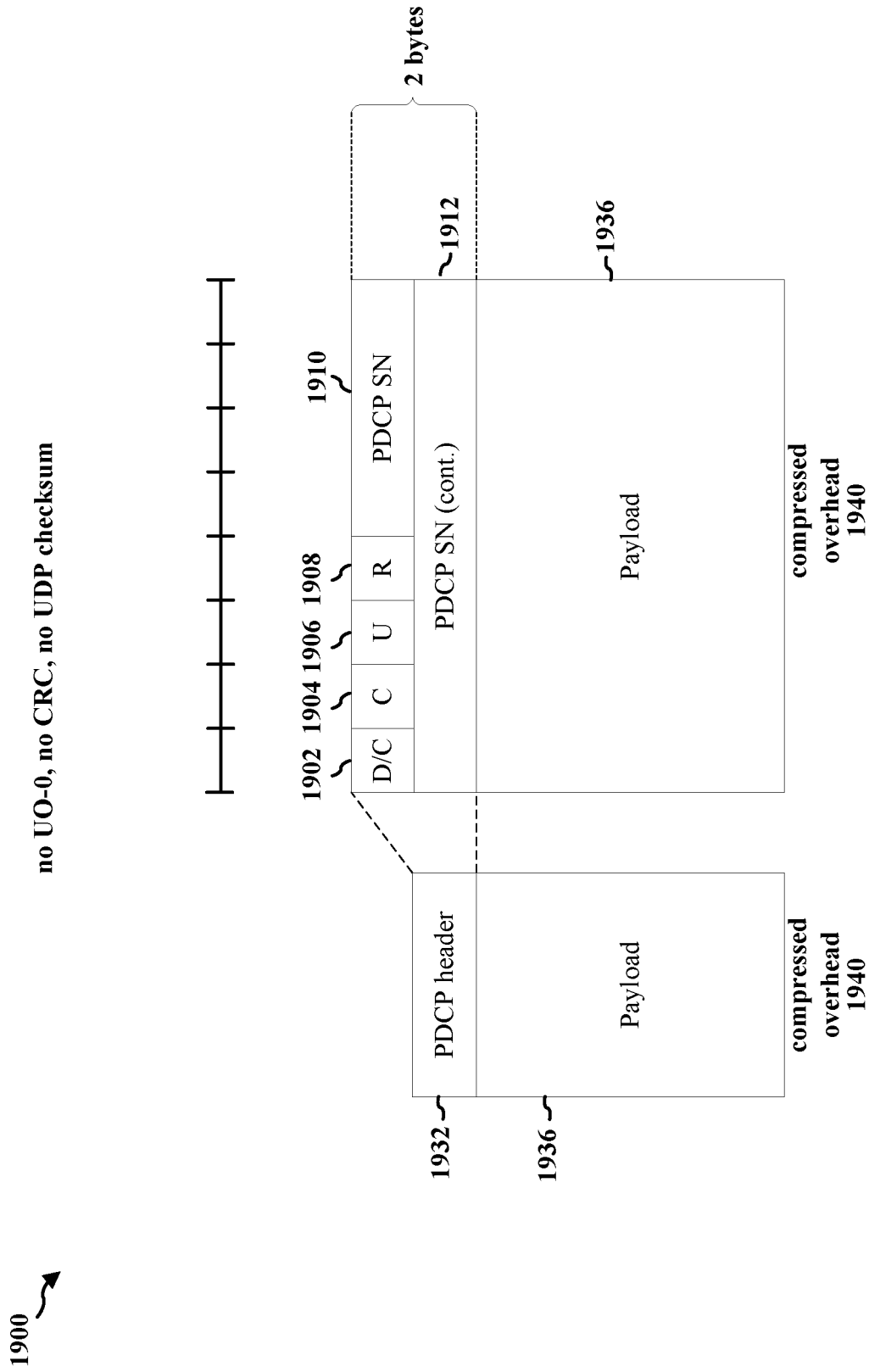
FIG. 19 shows a diagram of a compressed overhead that does not have a ROHC header.

FIG. 19 shows a diagram 1900 of a compressed overhead 1940 that does not have a ROHC header. The compressed overhead 1940 in FIG. 19 shares some similarities to the compressed overhead 1140 in FIG. 11. For example, the payload 1936, D/C field 1902, C field 1904, reserved bit 1908, PDCP SN field 1910, and PDCP SN 1912, in FIG. 19 may be similar to the ROHC payload 1136, D/C field 1102, C field 1104, reserved field 1108, PDCP SN field 1910, and PDCP SN field 1112 in FIG. 11, respectively. However, the compressed overhead 1940 does not have a UDP checksum field. In some aspects, a compressor may be configured to not enable a UDP checksum. Such a compressor may enable/disable a flag for the U field 1906 to indicate that the UDP checksum is disabled. For example, a 0 may be used for the U field 1906 to indicate that the UDP checksum is enabled, and a 1 may be used for the U field 1906 to indicate that the UDP checksum does not exist. A decompressor that receives the PDCP header 1932 having a U field 1906 that indicates that the UDP checksum does not exist does not need to search through the payload 1936 for a UDP checksum. In other words, the U field 1906 may function as a UDP checksum indicator that indicates whether or not the message includes the UDP checksum. The decompressor may be configured to derive, or forgo deriving, the UDP checksum based upon the value of the U field. After deriving the UDP checksum, the decompressor may then output the UDP checksum to the next layer.

Such a header may be useful, for example, in aspects where a network entity is configured to indicate to a UE to disable UDP checksum. The network entity may indicate such a configuration in any suitable manner, for example in an RRC message, a PDCP control PDU (e.g., ROHC feedback), a MAC control element (CE), or a PDCCH (DCI).

The AS layer in such a signal may be used to indicate disabling the UDP checksum to the UE. The network entity may be configured to indicate to the UE to remove the UDP checksum from packets of a certain type, for example from voice packets transmitted by the UE or from any compressed packet.

Such a network entity may be configured to regenerate the UDP checksum that was not received by a first UE after receipt of the header. This may be useful to improve robustness of the transmission where the network entity has more bandwidth/resources than the first UE. The network entity may be configured to use the IP address and the payload of the transmission received from the first UE without the UDP checksum, calculate the UDP checksum, and then insert the UDP checksum into the header for transmission to a second UE. The network entity may be configured to first decompress IP/UDP/RTP headers (e.g., IP header 612, UDP header 614, and RTP header 616 header in FIG. 6) using compression context and calculate the UDP checksum, if configured to. Any suitable network entity of the network may be configured to regenerate the UDP checksum, and the assignment may be made dynamically in response to an optimization algorithm (e.g., assign to one of a DU, CU, or an RU based on an available processing resource threshold).

Figure 20:
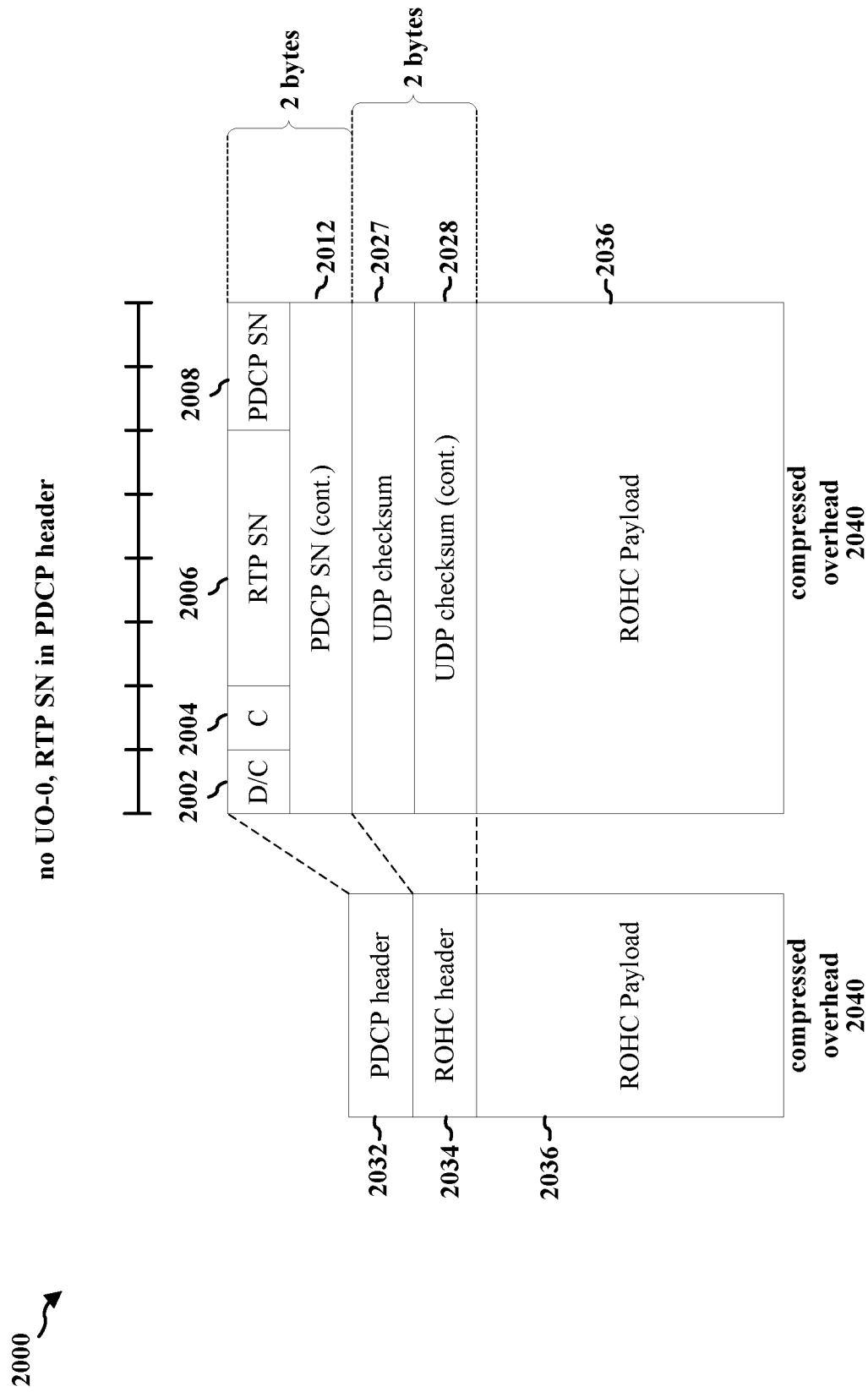
FIG. 20 shows a diagram of a compressed overhead having a ROHC header without a UO-0 header, but with the compressed RTP SN transmitted in the PDCP header.

FIG. 20 shows a diagram 2000 of a compressed overhead 2040 having a ROHC header 2034 without a UO-0 header, but with the compressed RTP SN transmitted in the PDCP header 2032. The compressed overhead 2040 in FIG. 20 shares some similarities to the compressed overhead 1140 in FIG. 11. For example, the ROHC payload 2036, D/C field 2002, C field 2004, PDCP SN 2012, UDP checksum 2027, and UDP checksum 2028 in FIG. 20 may be similar to the ROHC payload 1136, D/C field 1102, C field 1104, PDCP SN field 1112, UDP field 1127, and UDP field 1128 in FIG. 11, respectively. However, the PDCP header 2032 in FIG. 20 is configured to store 4-bits of a compressed RTP SN in the RTP SN field 2006 and only 2-bits of the PDCP SN in the PDCP SN field 2008, as opposed to the 4-bits in the PDCP SN field 1110 in FIG. 11. The RTP SN field 2006 may be populated using a full RTP SN, such as by using the 4 LSBs of a 16-bit RTP SN or a 32-bit RTP SN.

While the compressed overhead 2040 shortens the effective PDCP SN from 12 bits to 10 bits, the compressed overhead 2040 allows for a compressed RTP SN to be transmitted while still saving 1 byte of space by not transmitting the UO-0 header with the ROHC header 2034. Providing the RTP SN in the PDCP header 2032 improves the robustness by allowing a receiving device to receive a compressed RTP SN while still saving 1 byte of space by not transmitting the UO-0 header in the ROHC header 2034.

Figure 21:
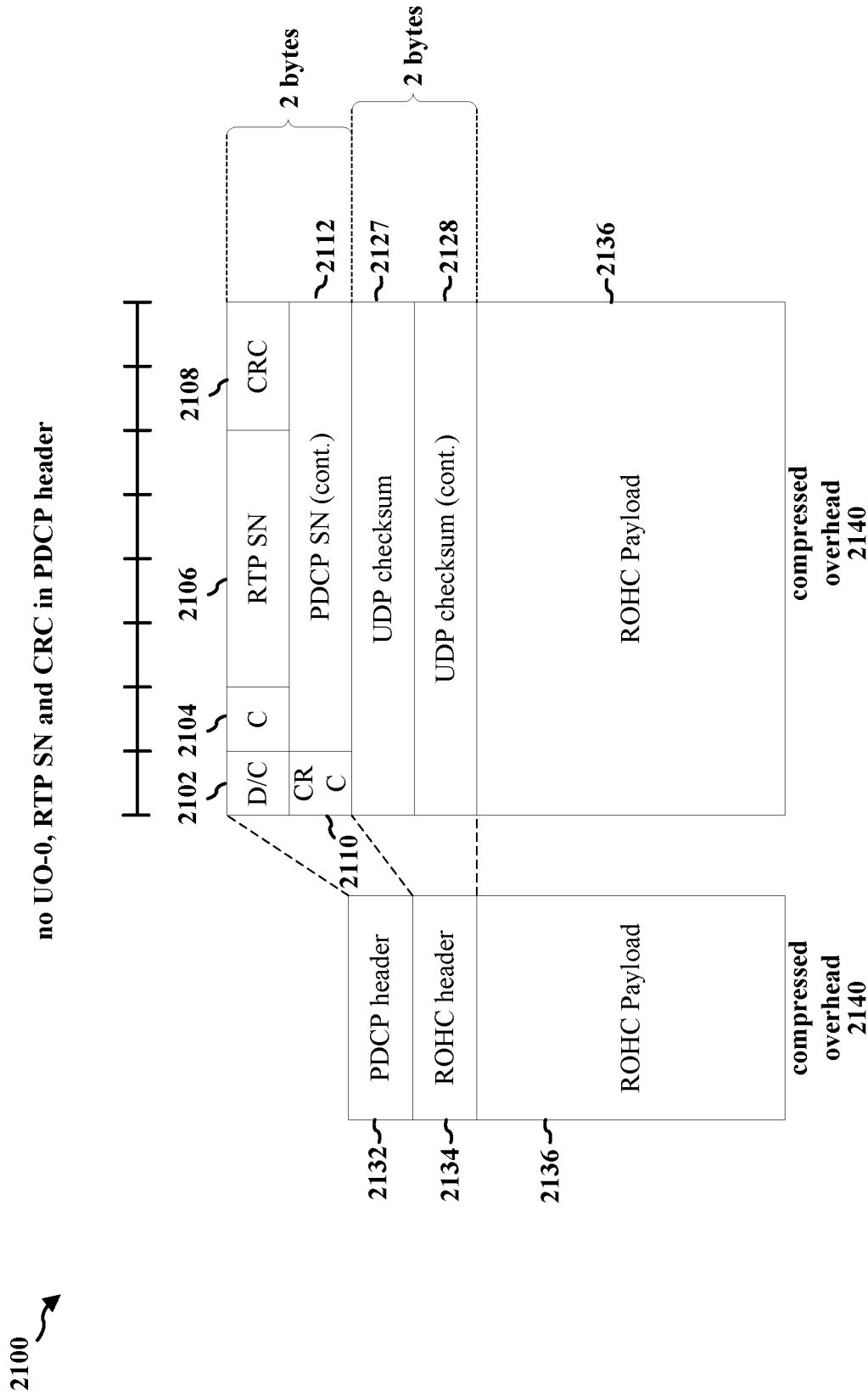
FIG. 21 shows a diagram of a compressed overhead having a ROHC header without a UO-0 header, but with the compressed RTP SN and CRC transmitted in the PDCP header.

FIG. 21 shows a diagram 2100 of a compressed overhead 2140 having a ROHC header 2134 without a UO-0 header, but with the compressed RTP SN and CRC transmitted in the PDCP header 2132. The compressed overhead 2140 in FIG. 21 shares some similarities to the compressed overhead 1140 in FIG. 11. For example, the ROHC payload 2136, D/C field 2102, C field 2104, UDP checksum 2127, and UDP checksum 2128 in FIG. 21 may be similar to the ROHC payload 1136, D/C field 1102, C field 1104, UDP field 1127, and UDP field 1128 in FIG. 11, respectively. However, the PDCP header 2132 in FIG. 21 is configured to store 4-bits of a compressed RTP SN in the RTP SN field 2106, to store 2-bits of the CRC in the CRC field 2108, 1-bit of the CRC in the CRC field 2110, and only 7-bits of the PDCP SN in the PDCP SN field 2112, as opposed to the 8-bits in the PDCP SN field 1112 and 4-bits in the PDCP SN field 1110 in FIG. 11.

While the compressed overhead 2140 shortens the effective PDCP SN from 12 bits to 7 bits, the compressed overhead 2140 allows for a compressed RTP SN and a CRC to be transmitted while still saving 1 byte of space by not transmitting the UO-0 header with the ROHC header 2134.

Figure 22:
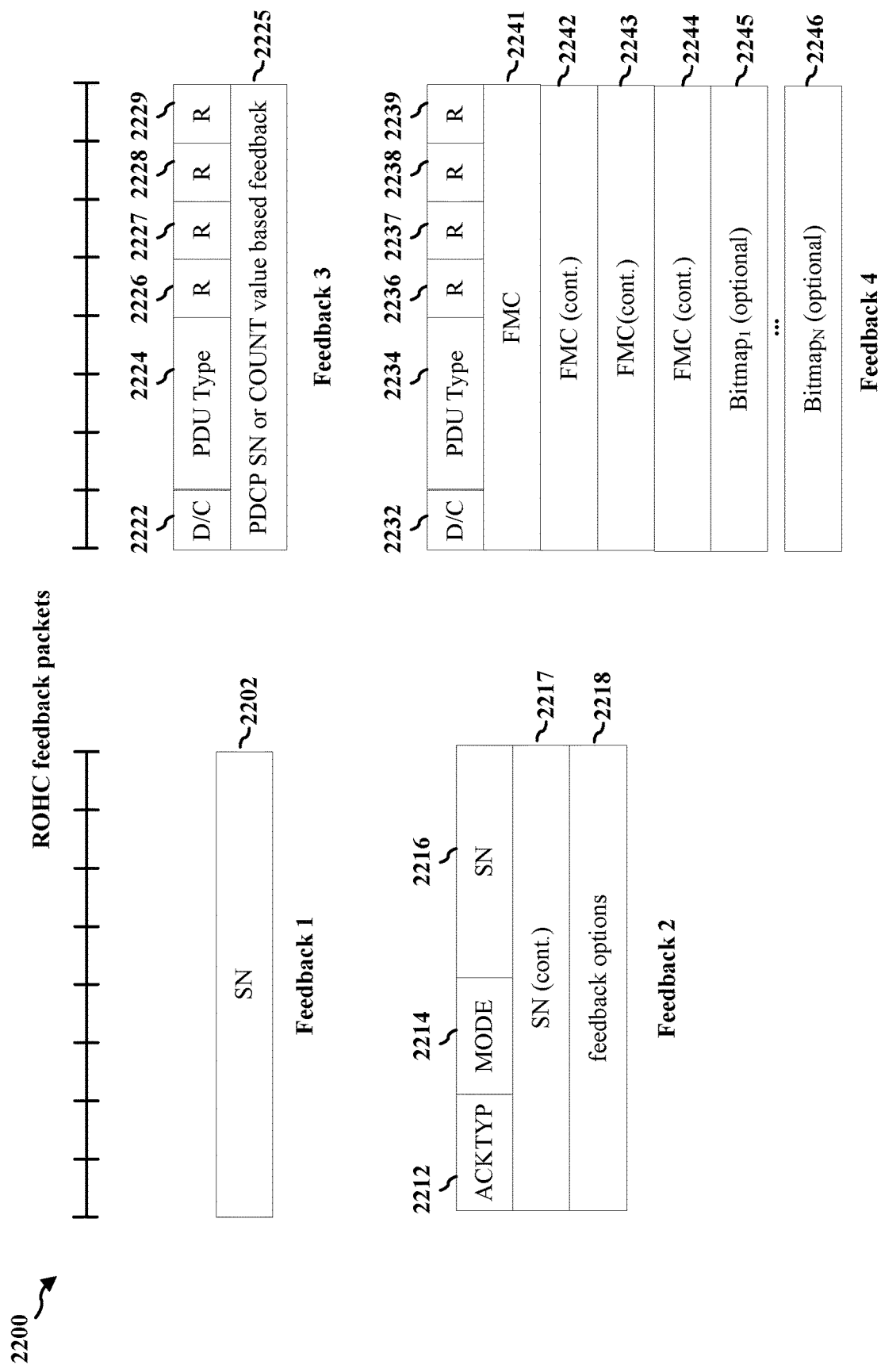
FIG. 22 shows a diagram of optional feedback packets that may be used by a receiver or a decompressor in response to receiving a transmission without a compressed RTP SN.

FIG. 22 shows a diagram 2200 of optional feedback packets that may be used by a receiver or a decompressor in response to receiving a transmission without a compressed RTP SN, such as in the RTP SN field 625 in FIG. 6 or the RTP SN field 2106 in FIG. 21.

In some aspects, a receiver or a decompressor may be configured to base feedback to PDCP SN or a count value instead of RTP SN to provide a reliable identifier for an ACK/NACK to refer to. Feedback 1 shows an ACK having an SN field 2202 which may be used to include 8-bits of the PDCP SN (e.g., the 8 LSBs of the PDCP SN) or 8-bits of the count value used by the decompressor. For example, a decompressor, such as the decompressor 1204 in FIG. 12, may feedback an ACK for a certain packet, such as an IR packet, output to the compressor 1202. The compressor 1202 may then confirm the context establishment/update of the compression context and may start to transmit compressed packets.

Feedback 2 shows a NACK having a 2-bit ACK type field 2212, a 2-bit ACK mode field 2214, a 4-bit SN field 2216, an 8-bit SN field 2217, and an 8-bit feedback option field 2218. The ACK type field 2212 may be used to indicate a type of ACK/NACK, such as a 00 for an ACK, a 01 for a NACK, and a 10 for a static NACK. The decompressor may be configured to feedback a NACK if a CRC fails, which may trigger the compressor to transmit a larger header packet to re-synchronize the decompressor. The decompressor may also be configured to feedback a static NACK in response to receiving a compressed packet before compression context is established by the decompressor, which may act as a "pending ACK" signal to the compressor. The ACK mode field 2214 may be used to indicate a mode of the ACK, such as a 01 for a unidirectional mode, a 10 for a bidirectional O-mode, and a 11 for a bidirectional reliable mode. The 4-bit SN field 2216 and the 8-bit SN field 2217 may be used to include all 12 bits of the PDCP SN or the count value used by the decompressor. In some aspects, the decompressor may even provide the derived RTP SN value in the SN field 2216 and the SN field 2217. The feedback option field 2218 may be used to provide additional feedback to the compressor as needed, but may also be a wasteful and needless transmission of bytes.

Feedback 3 shows a more efficient PDCP PDU type having a 1-bit D/C field 2222, a 3-bit PDU type field 2224, a 1-bit reserved field 2226, a 1-bit reserved field 2227, a 1-bit reserved field 2228, a 1-bit reserved field 2229, and an 8-bit feedback field 2225. The D/C field 2222 may be used to indicate whether a corresponding PDU is a data PDU or a control PDU. The PDU type field 2224 may be used to select different types of ACK/NACK responses, such as ACK, NACK, or static NACK. The reserved fields 2226, 2227, 2228, and 2229 may be reserved for future use. The 8-bit feedback field 2225 may be used to provide 8-bits of the PDCP SN or the count value used by the decompressor. In other aspects, the reserved fields 2226, 2227, 2228, and 2229 may be used to provide all 12 bits of the PDCP SN to use as an identifier of the received transmission. Feedback 3 provides an efficient PDCP PDU to accommodate PDCP SN based feedback.

Feedback 4 shows a PDCP PDU type having a 1-bit D/C field 2232, a 3-bit PDU type field 2234, a 1-bit reserved field 2236, a 1-bit reserved field 2237, a 1-bit reserved field 2238, a 1-bit reserved field 2239, an 8-bit first missing count (FMC) field 2241, an 8-bit FMC field 2242, an 8-bit FMC field 2243, an 8-bit FMC field 2244, and a series of 8-bit bitmap fields from bitmap$_1$ field 2245 to bitmap$_N$ field 2246. Feedback 4 is similar to Feedback 3, but allows a decompressor to provide a comprehensive PDCP status report. Similar to feedback 3, the D/C field 2232 may be used to indicate whether a corresponding PDU is a data PDU or a control PDU. The PDU type field 2234 may be used to select different types of ACK/NACK responses, such as ACK, NACK, static NACK, or a comprehensive PDCP status report. The reserved fields 2236, 2237, 2238, and 2239 may be reserved for future use. The FMC fields 2241, 2242, 2243, and 2244 may be used to provide a series of PDCP SN starting count numbers for missing counts, and the bitmap fields from bitmap$_1$ field 2245 to bitmap$_N$ field 2246 may be used to indicate the number of counts from the first missing PDCP SDU up to and including the last missing PDCP SDU.

Figure 23:
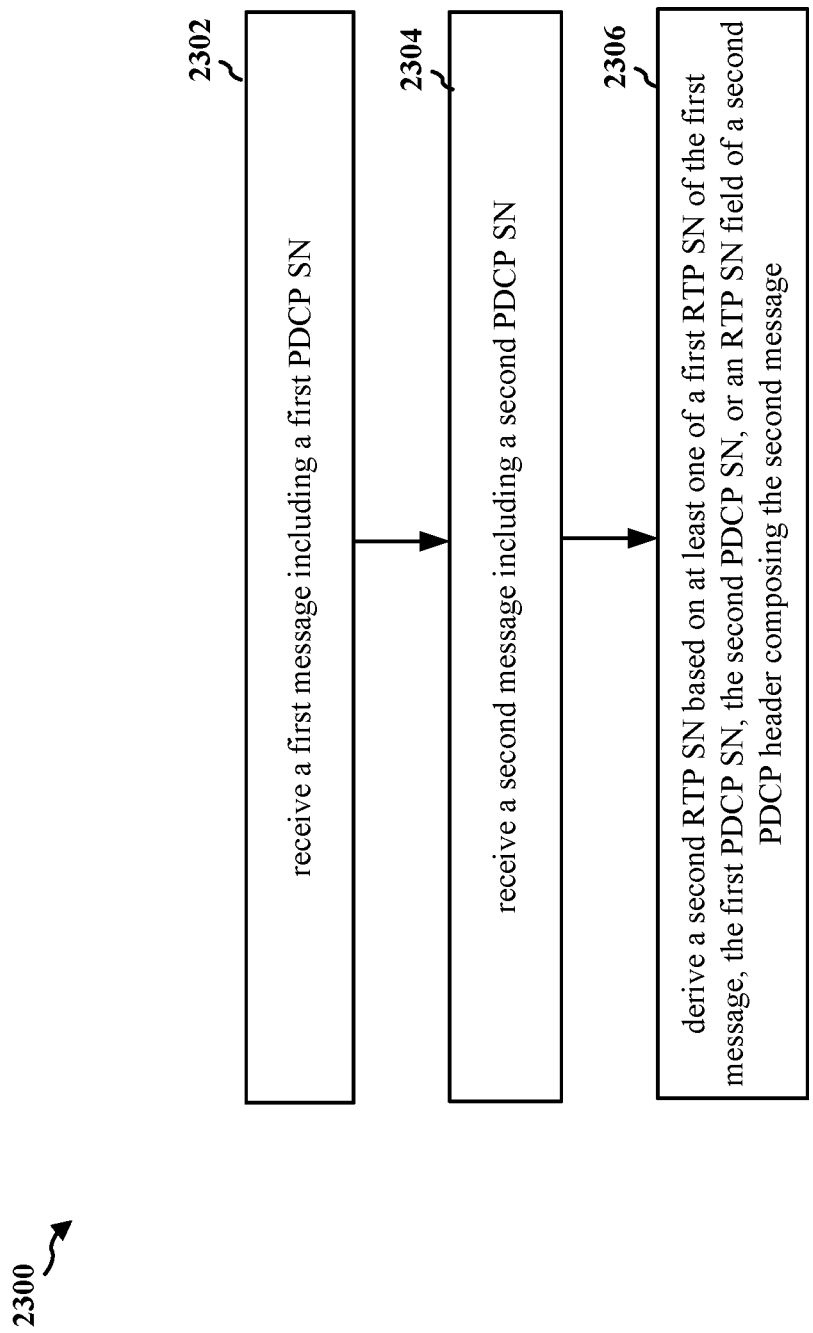
FIG. 23 is a flowchart of a method of wireless communication.

FIG. 23 is a flowchart 2300 of a method of wireless communication. The method may be performed by a UE (e.g., the UE 104; the apparatus 2504). The method may be performed by a base station (e.g., the base station 102; the network entity 2502; the CU 2610; the DU 2630; the RU 2640). At 2302, a device may receive a first message including a first PDCP SN. For example, 2302 may be performed by a decompressor 1204 in FIG. 12 configured to receive a transmission 1206. The transmission 1206 may include a PDCP SN 0.

At 2304, a device may receive a second message including a second PDCP SN. For example, 2304 may be performed by a decompressor 1204 in FIG. 12 configured to receive a transmission 1210 including a PDCP SN 2.

At 2306, a device may derive a second RTP SN based on at least one of a first RTP SN of the first message, the first PDCP SN, the second PDCP SN, or an RTP SN field of a second PDCP header composing the second message. For example, 2308 may be performed by a decompressor 1204 in FIG. 12 configured to derive a second RTP SN based on incrementing the RTP SN of transmission 1206 with a count value 1236 of the transmission 1210. 2306 may also be performed by a decompressor 1204 in FIG. 12 configured to derive a second RTP SN based on the value of the second PDCP SN of the compressed header of the transmission 1214. 2306 may also be performed by a decompressor that receives the PDCP header 2032 in FIG. 20 by reading the compressed RTP SN saved in the RTP SN field 2006 of the PDCP header 2032, and deriving a second RTP SN based on the compressed RTP SN.

Figure 24:
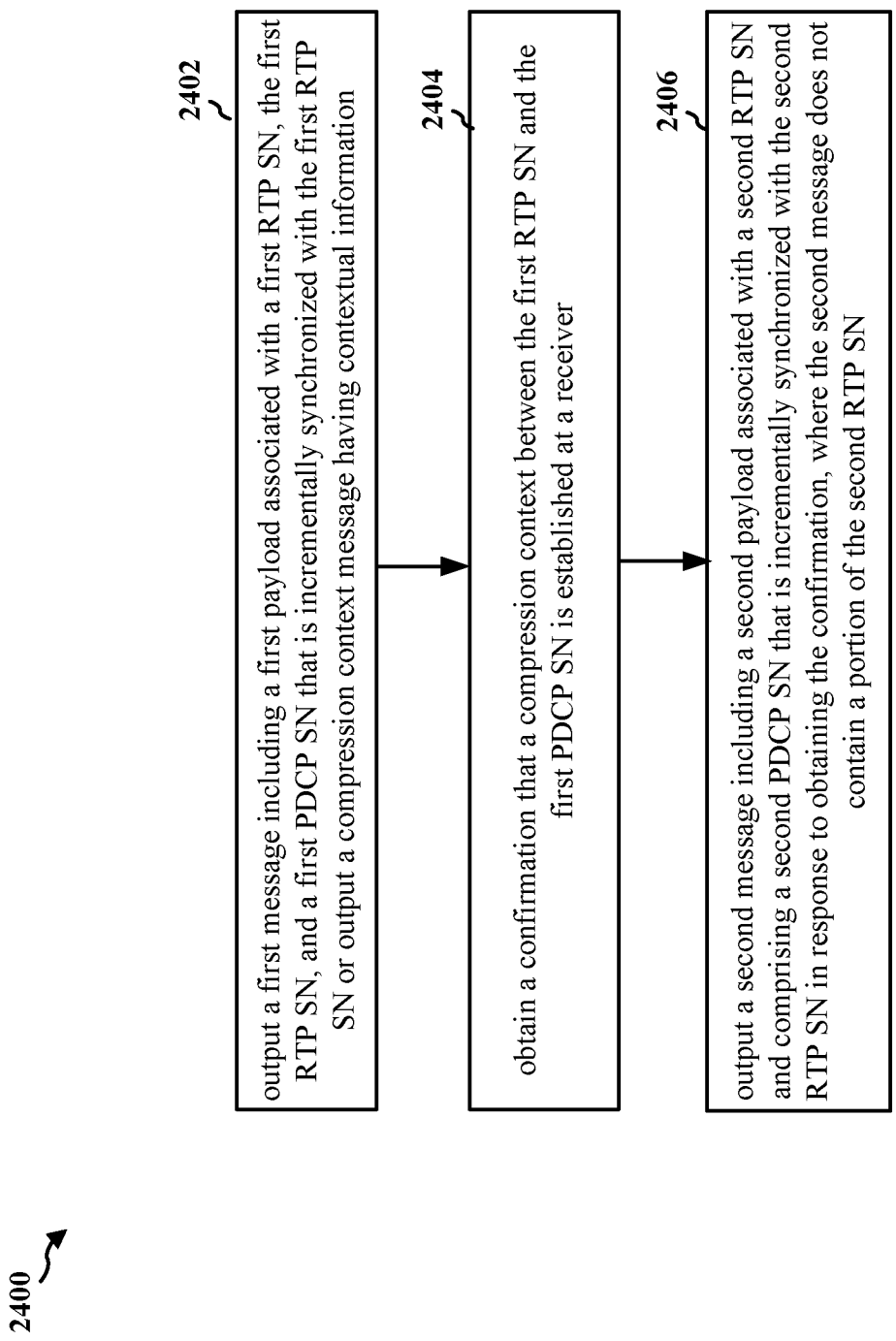
FIG. 24 is another flowchart of a method of wireless communication.

FIG. 24 is a flowchart 2400 of a method of wireless communication. The method may be performed by a UE (e.g., the UE 104; the apparatus 2504). The method may be performed by a base station (e.g., the base station 102; the network entity 2502; the CU 2610; the DU 2630; the RU 2640). At 2402, a device may output a first message including a first payload associated with a first RTP SN, the first RTP SN, and a first PDCP SN that is incrementally synchronized with the first RTP SN or output a compression context message having contextual information. For example, 2402 may be performed by a compressor 1202 in FIG. 12 configured to output a transmission 1206 to the decompressor 1204. The transmission 1206 may have a payload associated with the RTP SN 1232 of the transmission 1206, an RTP SN X, and the PDCP SN 0. The RTP SN X and the PDCP SN may be incrementally synchronized with one another. Alternatively, the compressor 802 in FIG. 8 may be configured to transmit a compression context message, such as an RRC configuration, having contextual information that the decompressor 804 may use to determine a compression context.

At 2404, a device may obtain a confirmation that a compression context between the first RTP SN and the first PDCP SN is established at a receiver. For example, 2404 may be performed by a compressor 802 in FIG. 8 configured to obtain a confirmation as an ACK 810 that the decompressor 804 has established a compression context between an RTP SN and a PDCP SN. In another aspect, 2404 may be performed by a compressor 1202 in FIG. 12 configured to obtain a confirmation as a transmission of at least two full headers in the transmission 1206 and the transmission 1208, confirming that the decompressor 1204 has established a compression context between the RTP SN 1232 and the PDCP SN. The RTP SN 1232 is in incremental synchronization with the PDCP SN of the transmissions 1206 and 1208.

At 2406, a device may output a second message including a second payload associated with a second RTP SN and comprising a second PDCP SN that is incrementally synchronized with the second RTP SN in response to obtaining the confirmation, where the second message does not contain a portion of the second RTP SN. For example, 2406 may be performed by a compressor 1202 in FIG. 12, configured to output a transmission 1210 to the decompressor 1204. The transmission 1210 may include a second payload associated with the RTP SN 1232 of the transmission 1210, and the PDCP SN 2. The PDCP SN 2 may be incrementally synchronized with the RTP SN 1232 of the transmission 1210. The transmission 1210 does not include any portion of the RTP SN 1232 of transmission 1210.

Figure 25:
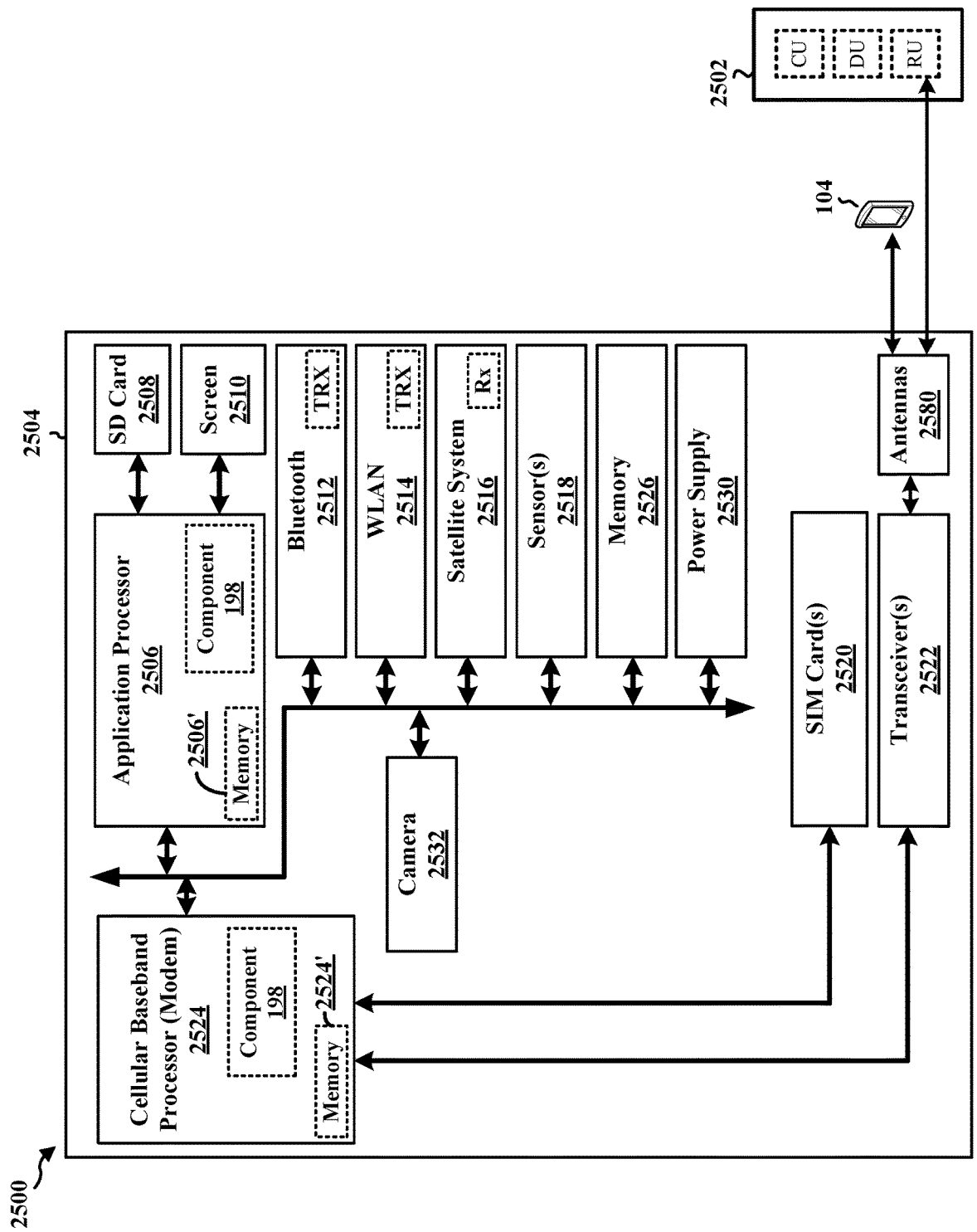
FIG. 25 is a diagram illustrating an example of a hardware implementation for an example apparatus and/or network entity.

FIG. 25 is a diagram 2500 illustrating an example of a hardware implementation for an apparatus 2504. The apparatus 2504 may be a UE, a component of a UE, or may implement UE functionality. In some aspects, the apparatus 2404 may include a cellular baseband processor 2524 (also referred to as a modem) coupled to one or more transceivers 2522 (e.g., cellular RF transceiver). The cellular baseband processor 2524 may include on-chip memory 2524'. In some aspects, the apparatus 2504 may further include one or more subscriber identity modules (SIM) cards 2520 and an application processor 2506 coupled to a secure digital (SD) card 2508 and a screen 2510. The application processor 2506 may include on-chip memory 2506'. In some aspects, the apparatus 2504 may further include a Bluetooth module 2512, a WLAN module 2514, a satellite system module 2516 (e.g., GNSS module), one or more sensor modules 2518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2526, a power supply 2530, and/or a camera 2532. The Bluetooth module 2512, the WLAN module 2514, and the satellite system module 2516 may include an on-chip transceiver (TRX)/receiver (RX). The cellular baseband processor 2524 communicates through the transceiver(s) 2522 via one or more antennas 2580 with the UE 104 and/or with an RU associated with a network entity 2502. The cellular baseband processor 2524 and the application processor 2506 may each include a computer-readable medium/memory 2524', 2506', respectively. The additional memory modules 2526 may also be considered a computer-readable medium/memory. Each computer-readable medium/memory/memory modules 2524', 2506', 2526 may be non-transitory. The cellular baseband processor 2524 and the application processor 2506 are each responsible for general processing, including the execution of software stored on the computer-readable medium/memory. The software, when executed by the cellular baseband processor 2524/application processor 2506, causes the cellular baseband processor 2524/application processor 2506 to perform the various functions described supra. The computer-readable medium/memory may also be used for storing data that is manipulated by the cellular baseband processor 2524/application processor 2506 when executing software. The cellular baseband processor 2524/application processor 2506 may be a component of the UE 350 and may include the memory 360 and/or at least one of the TX processor 368, the RX processor 356, and the controller/processor 359. In one configuration, the apparatus 2504 may be a processor chip (modem and/or application) and include just the cellular baseband processor 2524 and/or the application processor 2506, and in another configuration, the apparatus 2504 may be the entire UE (e.g., see 350 of FIG. 3) and include the additional modules of the apparatus 2504.

As discussed supra, the component 198 may be configured to receive a first message including a first PDCP SN. The component 198 may be further configured to receive a second message including a second PDCP SN. The component 198 may by further configured to derive a second RTP SN based on at least one of a first RTP SN of the first message, the first PDCP SN, the second PDCP SN, or an RTP SN field of a second PDCP header composing the second message. The component 198 may be within the cellular baseband processor 2524, the application processor 2506, or both the cellular baseband processor 2524 and the application processor 2506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2504 may include a variety of components configured for various functions. In one configuration, the apparatus 2504, and in particular the cellular baseband processor 2524 and/or the application processor 2506, includes means for receiving a first message including a first PDCP SN, means for receiving a second message including a second PDCP SN, means for deriving a second RTP SN based on at least one of a first RTP SN of the first message, the first PDCP SN, the second PDCP SN, or an RTP SN field of a second PDCP header composing the second message, means for processing a first payload of the first message based on the first RTP SN, means for processing a payload header of the second message based on the second RTP SN, means for deriving a second CRC based on a second PDCP header of the second message, means for decompressing a transport header of the second message based on the second CRC, means for generating a first count value based on receiving the first PDCP SN, means for generating a second count value based on receiving the second PDCP SN, means for deriving the second RTP SN by incrementing the first RTP SN based on at least one of a difference between at least a portion of the first and second count values or at least a portion of the second count value, means for deriving the second RTP SN by based on the first RTP SN, at least one of a difference between at least a portion of the first and second count values or at least a portion of the second count value, and the second message including a discontinuous count indicator indicating a lost RTP SN, means for deriving the second RTP SN by incrementing the first RTP SN based on at least one of a difference between at least a portion of the first and second PDCP SN or at least a portion of the second PDCP SN, means for deriving the second RTP SN based on the second PDCP SN by deriving at least a portion of the second RTP SN based on a set of LSB of the second PDCP SN, means for transmitting an ACK/NACK including a portion of the second PDCP SN, means for transmitting a control PDU including a PDCP PDU type and a feedback value based on a reception of the second message or a result of deriving the second RTP SN, means for receiving a message including a PDCP header and a payload, means for deriving a transport protocol header of the message, means for deriving a UDP checksum based on at least a portion of the derived transport protocol header in response to determining that a UDP checksum indicator of the PDCP header indicates that the message does not include the UDP checksum, means for outputting the message including the UDP checksum and the derived transport protocol header of the message, and means for foregoing deriving the UDP checksum in response to determining that the UDP checksum indicator of the PDCP header indicates that the message does include the UDP checksum. The means may be the component 198 of the apparatus 2504 configured to perform the functions recited by the means. As described supra, the apparatus 2504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 26:
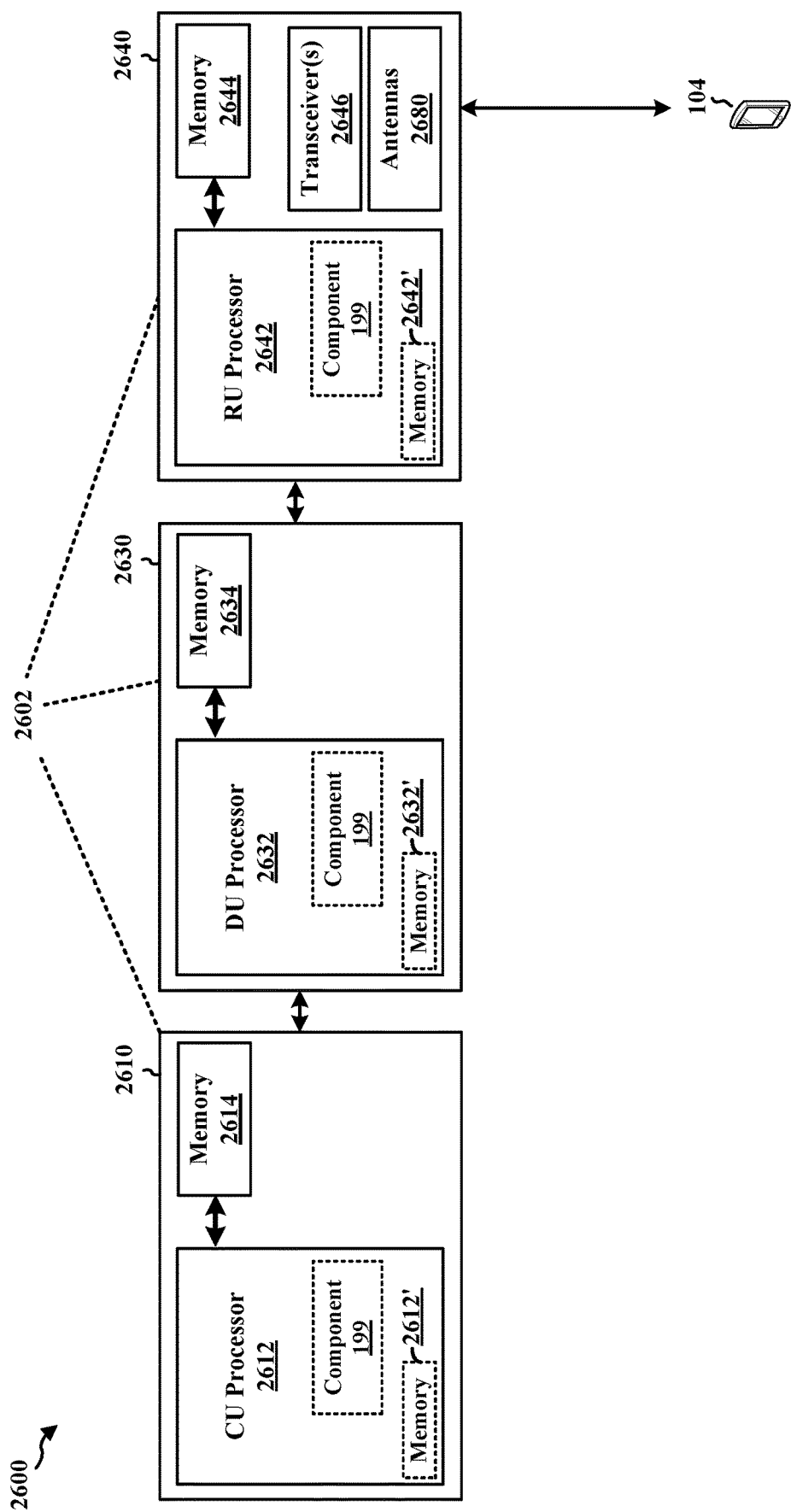
FIG. 26 is a diagram illustrating an example of a hardware implementation for an example network entity.

FIG. 26 is a diagram 2600 illustrating an example of a hardware implementation for a network entity 2602. The network entity 2602 may be a BS, a component of a BS, or may implement BS functionality. The network entity 2602 may include at least one of a CU 2610, a DU 2630, or an RU 2640. For example, depending on the layer functionality handled by the component 199, the network entity 2602 may include the CU 2610; both the CU 2610 and the DU 2630; each of the CU 2610, the DU 2630, and the RU 2640; the DU 2630; both the DU 2630 and the RU 2640; or the RU 2640. The CU 2610 may include a CU processor 2612. The CU processor 2612 may include on-chip memory 2612'. In some aspects, the CU 2610 may further include additional memory modules 2614. The CU 2610 communicates with the DU 2630. The DU 2630 may include a DU processor 2632. The DU processor 2632 may include on-chip memory 2632'. In some aspects, the DU 2630 may further include additional memory modules 2634. The DU 2630 communicates with the RU 2640. The RU 2640 may include an RU processor 2642. The RU processor 2642 may include on-chip memory 2642'. In some aspects, the RU 2640 may further include additional memory modules 2644, one or more transceivers 2646, and antennas 2680. The RU 2640 communicates with the UE 104. The on-chip memory 2612', 2632', 2642' and the additional memory modules 2614, 2634, 2644 may each be considered a computer-readable medium/memory. Each computer-readable medium/memory may be non-transitory. Each of the processors 2612, 2632, 2642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to output a first message including a first payload associated with a first RTP SN, the first RTP SN, and a first PDCP SN that is incrementally synchronized with the first RTP SN. The component 199 may be further configured to obtain a confirmation that a compression context between the first RTP SN and the first PDCP SN is established at a receiver. The component 199 may be further configured to output a second message including a second payload associated with a second RTP SN and including a second PDCP SN that is incrementally synchronized with the second RTP SN in response to obtaining the confirmation, where the second message does not contain a portion of the second RTP SN. The component 199 may be within one or more processors of one or more of the CU 2610, DU 2630, and the RU 2640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2602 may include a variety of components configured for various functions. In one configuration, the network entity 2602 includes means for outputting a first message including a first payload associated with a first RTP SN, the first RTP SN, and a first PDCP SN that is incrementally synchronized with the first RTP SN, means for outputting a compression context message having contextual information, means for obtaining a confirmation that a compression context between the first RTP SN and the first PDCP SN is established at a receiver, means for outputting a second message including a second payload associated with a second RTP SN and including a second PDCP SN that is incrementally synchronized with the second RTP SN in response to obtaining the confirmation, where the second message does not contain a portion of the second RTP SN, means for including a discontinuous count indicator that indicates that a lost RTP SN exists to the second message in response to the lost RTP SN existing between the first payload and the second payload, means for obtaining the confirmation by obtaining a feedback packet including a feedback PDCP SN based on at least a portion of the first PDCP SN, means for obtaining the confirmation by obtaining a control PDU comp including rising a PDCP PDU type and a feedback value based on a reception of the second message or a result of deriving the second RTP SN, means for obtaining the confirmation by outputting a threshold number of messages having a set of PDCP SN that are incrementally synchronized with the first RTP SN, means for initializing a new compression context for the receiver, means for initializing the new compression context using an RRC connection release, an intra-cell HO, an RRC connection re-establishment, or an RB removal and an RB addition, means for outputting a first message including a first payload associated with a first RTP SN, a first RTP SN including the first RTP SN, and a first PDCP header, and means for outputting a second message including a second payload associated with the RTP SN, and a second PDCP header, where the PDCP header includes an RTP SN field populated by at least a portion of the second RTP SN. The means may be the component 199 of the network entity 2602 configured to perform the functions recited by the means. As described supra, the network entity 2602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A"

(where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a receiver, including receiving a first message including a first PDCP SN. The method may further include receiving a second message including a second PDCP SN. The method may further include deriving a second RTP SN based on at least one of a first RTP SN of the first message, the first PDCP SN, the second PDCP SN, or an RTP SN field of a second PDCP header composing the second message.

Aspect 2 is the method of aspect 1, further including processing a first payload of the first message based on the first RTP SN. The method may further include processing a second payload of the second message based on the second RTP SN.

Aspect 3 is the method of aspect 2 further including deriving a second CRC based on a second PDCP header of the second message. The method may further include decompressing a transport header of the second message based on the second CRC.

Aspect 4 is the method of any of aspects 1 to 3, where deriving the second RTP SN may include (a) generating a first count value based on receiving the first PDCP SN, (b) generating a second count value based on receiving the second PDCP SN, and (c) deriving the second RTP SN by incrementing the first RTP SN based on at least one of a difference between at least a portion of the first and second count values or at least a portion of the second count value.

Aspect 5 is the method of any of aspects 1 to 3, where deriving the second RTP SN may include (a) generating a first count value based on receiving the first PDCP SN, (b) generating a second count value based on receiving the second PDCP SN, and (c) deriving the second RTP SN by based on the first RTP SN, at least one of a difference between at least a portion of the first and second count values or at least a portion of the second count value, and the second message including a discontinuous count indicator indicating a lost RTP SN.

Aspect 6 is the method of any of aspects 1 to 5, where deriving the second RTP SN may include deriving the second RTP SN by incrementing the first RTP SN based on at least one of a difference between at least a portion of the first and second PDCP SN or at least a portion of the second PDCP SN.

Aspect 7 is the method of any of aspects 1 to 6, further including deriving the second RTP SN based on the second PDCP SN by deriving at least a portion of the second RTP SN based on a set of least significant bits (LSB) of the second PDCP SN.

Aspect 8 is the method of any of aspects 1 to 7, where the second message does not include a portion of the second RTP SN.

Aspect 9 is the method of aspect 8, where the second PDCP header includes a compression indicator indicating that the second message does not include the portion of the second RTP SN.

Aspect 10 is the method of any of aspects 1 to 9, further including transmitting an ACK/NACK including a portion of the second PDCP SN.

Aspect 11 is the method of any of aspects 1 to 10, further including transmitting a control PDU including a PDCP PDU type and a feedback value based on a reception of the second message or a result of deriving the second RTP SN.

Aspect 12 is the method of aspect 11, where the control PDU further includes a PDCP status report.

Aspect 13 is a method of wireless communication, including outputting a first message including (a) a first payload associated with a first RTP SN, (b) the first RTP SN, and (c) a first PDCP SN that is incrementally synchronized with the first RTP SN or outputting a compression context message having contextual information. The method may further include obtaining a confirmation that a compression context between the first RTP SN and the first PDCP SN is established at a receiver. The method may further include outputting a second message including a second payload associated with a second RTP SN and including a second PDCP SN that is incrementally synchronized with the second RTP SN in response to obtaining the confirmation, where the second message does not contain a portion of the second RTP SN.

Aspect 14 is the method of aspect 13, where the second message further includes a compression indicator indicating that the second message does not include the portion of the second RTP SN.

Aspect 15 is the method of any of aspects 13 to 14, further comprising including a discontinuous count indicator that indicates that a lost RTP SN exists to the second message in response to the lost RTP SN existing between the first payload and the second payload.

Aspect 16 is the method of any of aspects 13 to 15, where a set of LSBs of the second PDCP SN share a set of LSBs of the second RTP SN.

Aspect 17 is the method of any of aspects 13 to 16, where the second message includes a second CRC associated with a compressed transport header of the second message.

Aspect 18 is the method of any of aspects 13 to 17, where the second message includes a second PDCP header having an RTP SN field populated by at least a portion of the second RTP SN.

Aspect 19 is the method of any of aspects 13 to 18, further including obtaining the confirmation by obtaining a feedback packet including a feedback PDCP SN based on at least a portion of the first PDCP SN.

Aspect 20 is the method of any of aspects 13 to 19, further including obtaining the confirmation by obtaining a control PDU including a PDCP PDU type and a feedback value based on a reception of the second message or a result of deriving the second RTP SN.

Aspect 21 is the method of any of aspects 13 to 20, where the control PDU includes a PDCP status report.

Aspect 22 is the method of any of aspects 13 to 21, further including obtaining the confirmation by outputting a threshold number of messages having a set of PDCP SN that are incrementally synchronized with the first RTP SN.

Aspect 23 is the method of any of aspects 13 to 22, further including, in response to a valid transmission not received by the receiver or not transmitted to the receiver for a threshold period of time, initializing a new compression context for the receiver.

Aspect 24 is the method of any of aspects 13 to 23, further including initializing the new compression context using an RRC connection release, an intra-cell HO, an RRC connection re-establishment, or an RB removal and an RB addition.

Aspect 25 is a method of wireless communication at a receiver, including receiving a message including a PDCP header and a payload. The method may further include deriving a transport protocol header of the message. The method may further include deriving a UDP checksum based on at least a portion of the derived transport protocol header in response to determining that a UDP checksum indicator of the PDCP header indicates that the message does not include the UDP checksum.

Aspect 26 is the method of aspect 25, further including outputting the message including the UDP checksum and the derived transport protocol header of the message.

Aspect 27 is the method of any of aspects 25 to 26, further including foregoing deriving the UDP checksum in response to determining that the UDP checksum indicator of the PDCP header indicates that the message does include the UDP checksum.

Aspect 28 is a method of wireless communication, including outputting a first message including a first payload associated with a first RTP SN, a first RTP SN including the first RTP SN, and a first PDCP header. The method may further include outputting a second message including a second payload associated with the RTP SN, and a second PDCP header, where the PDCP header includes an RTP SN field populated by at least a portion of the second RTP SN.

Aspect 29 is the method of aspect 28, where the first PDCP header does not include an RTP SN field populated by at least a portion of the first RTP SN.

Aspect 30 is the method of any of aspects 28 to 29, where the second message may include a compressed transport header. The PDCP header may further include a CRC field that validates a decompression of the compressed transport header.

Aspect 31 is the method of any of aspects 13 to 14, further including outputting a third message comprising a third payload associated with a third RTP SN, comprising a third PDCP SN that is incrementally synchronized with the third RTP SN, and comprising at least a portion of the third RTP SN, in response to a lost RTP SN existing between the first payload and the third payload.

What is claimed is:

1. An apparatus for wireless communication at a receiver, comprising:
    at least one memory; and
    at least one processor coupled to the at least one memory and, based at least in part on information stored in the at least one memory, the at least one processor is configured to:
        receive a first message comprising a first packet data convergence protocol (PDCP) sequence number (SN);
        receive a second message comprising a second PDCP SN, wherein the second message is associated with a second real-time transport protocol (RTP) SN, wherein the second message is not transmitted with a robust header compression (ROHC) header having a RTP SN field; and
        derive the second RTP SN based on at least one of:
            a first RTP SN of the first message,
            the first PDCP SN,
            the second PDCP SN, or
            a second RTP SN field of a second PDCP header, wherein the second message comprises the second PDCP header.

2. The apparatus of claim 1, wherein the at least one processor is further configured to:
    process a first payload of the first message based on the first RTP SN; and
    process a second payload of the second message based on the derived second RTP SN.

3. The apparatus of claim 2, wherein the at least one processor is further configured to:
    derive a second cyclic redundancy check (CRC) value based on the second PDCP header of the second message; and
    decompress a transport header of the second message based on the second CRC.

4. The apparatus of claim 2, wherein, to process the first payload of the first message based on the first RTP SN, the at least one processor is configured to decode the first payload of the first message based on the first RTP SN, wherein, to process the second payload of the first message based on the derived second RTP SN, the at least one processor is configured to decode the second payload of the first message based on the derived second RTP SN.

5. The apparatus of claim 1, wherein, to derive the second RTP SN associated with the second message, the at least one processor is configured to:
    generate a first count value based on receiving the first PDCP SN;
    generate a second count value based on receiving the second PDCP SN; and
    derive the second RTP SN by incrementing the first RTP SN based on at least one of a difference between at least a first portion of the first and second count values or at least a second portion of the second count value.

6. The apparatus of claim 1, wherein, to derive the second RTP SN associated with the second message, the at least one processor is configured to:
    generate a first count value based on receiving the first PDCP SN;
    generate a second count value based on receiving the second PDCP SN; and
    derive the second RTP SN by based on the first RTP SN, at least one of a difference between at least a first portion of the first and second count values or at least a second portion of the second count value, and the second message comprising a discontinuous count indicator indicating a lost RTP SN.

7. The apparatus of claim 1, wherein, to derive the second RTP SN associated with the second message, the at least one processor is further configured to:
derive the second RTP SN by incrementing the first RTP SN based on at least one of a difference between at least a first portion of the first and second PDCP SN or at least a second portion of the second PDCP SN.

8. The apparatus of claim 1, wherein, to derive the second RTP SN associated with the second message, the at least one processor is configured to:
derive at least a portion of the second RTP SN based on a set of least significant bits (LSB) of the second PDCP SN.

9. The apparatus of claim 1, wherein the received second message does not include the ROHC header having the RTP SN field.

10. The apparatus of claim 9, wherein the second PDCP header comprises a compression indicator field indicating that the second message does not include the ROHC header having the RTP SN field.

11. The apparatus of claim 1, wherein the at least one processor is further configured to:
transmit an acknowledgement or negative acknowledgement (ACK/NACK) comprising a portion of the second PDCP SN.

12. The apparatus of claim 1, wherein the at least one processor is further configured to:
transmit a control packet data unit (PDU) comprising a PDCP PDU type and a feedback value based on a reception of the second message or a result of deriving the second RTP SN.

13. The apparatus of claim 12, wherein the control PDU further comprises a PDCP status report.

14. The apparatus of claim 1, further comprising a transceiver coupled to the at least one processor, wherein the at least one processor is configured to:
receive, via the transceiver, the first message; and
receive, via the transceiver, the second message.

15. The apparatus of claim 1, wherein the second message does not comprise the ROHC header.

16. A method of wireless communication at a receiver, comprising:
receiving a first message comprising a first packet data convergence protocol (PDCP) sequence number (SN);
receiving a second message comprising a second PDCP SN, wherein the second message is associated with a second real-time transport protocol (RTP) SN, wherein the second message is not transmitted with a robust header compression (ROHC) header having an RTP SN field; and
deriving the second RTP SN based on at least one of:
a first RTP SN of the first message,
the first PDCP SN,
the second PDCP SN, or
a second RTP SN field of a second PDCP header, wherein the second message comprises the second PDCP header.

17. The method of claim 16, wherein deriving the second RTP SN associated with the second message comprises:
generating a first count value based on receiving the first PDCP SN;
generating a second count value based on receiving the second PDCP SN; and
deriving the second RTP SN by incrementing the first RTP SN based on at least one of a difference between at least a first portion of the first and second count values or at least a second portion of the second count value.

18. The method of claim 16, further comprising:
generating a first count value based on receiving the first PDCP SN;
generating a second count value based on receiving the second PDCP SN; and
deriving the second RTP SN by based on the first RTP SN, at least one of a difference between at least a first portion of the first and second count values or at least a second portion of the second count value, and the second message comprising a discontinuous count indicator indicating a lost RTP SN.

19. The method of claim 16, further comprising:
deriving at least a portion of the second RTP SN based on a set of least significant bits (LSB) of the second PDCP SN.

20. An apparatus for wireless communication at a receiver, comprising:
means for receiving a first message comprising a first packet data convergence protocol (PDCP) sequence number (SN);
means for receiving a second message comprising a second PDCP SN, wherein the second message is associated with a second real-time transport protocol (RTP) SN, wherein the second message is not transmitted with a robust header compression (ROHC) header having an RTP SN field; and
means for deriving the second RTP SN based on at least one of:
a first RTP SN of the first message,
the first PDCP SN,
the second PDCP SN, or
a second RTP SN field of a second PDCP header, wherein the second message comprises the second PDCP header.

* * * * *